United States Patent
Hao et al.

(10) Patent No.: US 12,184,362 B2
(45) Date of Patent: Dec. 31, 2024

(54) INTERFERENCE LAYER CATEGORIZATION AND NON ZERO POWER INTERFERENCE MEASUREMENT RESOURCE FOR NON LINEAR PRECODING

(71) Applicant: Qualcomm Incorporated, San Diego, CA (US)

(72) Inventors: Chenxi Hao, Beijing (CN); Yu Zhang, Beijing (CN); Liangming Wu, Beijing (CN); Hao Xu, Beijing (CN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 808 days.

(21) Appl. No.: 17/262,441

(22) PCT Filed: Aug. 13, 2019

(86) PCT No.: PCT/CN2019/100318
§ 371 (c)(1),
(2) Date: Jan. 22, 2021

(87) PCT Pub. No.: WO2020/034936
PCT Pub. Date: Feb. 20, 2020

(65) Prior Publication Data
US 2021/0297121 A1   Sep. 23, 2021

(30) Foreign Application Priority Data
Aug. 14, 2018   (WO) ............... PCT/CN2018/100478

(51) Int. Cl.
*H04B 7/0456*   (2017.01)
*H04L 5/00*   (2006.01)

(52) U.S. Cl.
CPC ......... *H04B 7/0456* (2013.01); *H04L 5/0048* (2013.01); *H04L 5/0053* (2013.01)

(58) Field of Classification Search
CPC .... H04B 7/0456; H04L 5/0048; H04L 5/0053
See application file for complete search history.

(56) References Cited

U.S. PATENT DOCUMENTS

2013/0021991 A1\* 1/2013 Ko .................... H04L 5/0053
370/329
2013/0182664 A1  7/2013 Chen et al.
(Continued)

FOREIGN PATENT DOCUMENTS

| CN | 102017484 A | 4/2011 |
| CN | 103988456 A | 8/2014 |

(Continued)

OTHER PUBLICATIONS

NTT Docomo: "Non-linear Precoding for NR", 3GPP TSG RAN WG1 Meeting #88, 3GPP Draft; R1-1702848, Athens, Greece; Feb. 13, 2017-Feb. 17, 2017, Feb. 17, 2017 (Feb. 17, 2017), pp. 1-6, URL: https://www.3gpp.org/ftp/tsg_ran/WG1_RL1/TSGR1_88/Docs/R1-1702848.zip. Section 2.

(Continued)

*Primary Examiner* — Jackie Zuniga Abad
(74) *Attorney, Agent, or Firm* — QUALCOMM Incorporated

(57) ABSTRACT

Methods, systems, and devices for wireless communications are described. In one aspect, the described techniques provide for identifying interference signals on multiple layers or resources and determining whether the interference signals transmitted on a particular layer or resource were precoded using linear precoding (LP) or NLP. In this aspect, a receiving device may equalize signals received from a transmitting device (e. g., filter out interference signals) based on determining whether the interference signals were precoded using (Continued)

a first type of precoding (e. g., linear precoding (LP)) or a second type of precoding (e. g., NLP). In another aspect, the described techniques provide for performing interference measurements on signals precoded using NLP based on categorizing interference resources as being precoded using LP or NLP. In this aspect, a receiving device may perform and report measurements differently for interference signals precoded using LP and interference signals precoded using NLP.

42 Claims, 17 Drawing Sheets

(56) References Cited

U.S. PATENT DOCUMENTS

| | | | |
|---|---|---|---|
| 2014/0023155 | A1 | 1/2014 | Khoryaev et al. |
| 2015/0043522 | A1 | 2/2015 | Mobasher et al. |
| 2015/0098440 | A1 | 4/2015 | Yang et al. |
| 2015/0230259 | A1 | 8/2015 | Park et al. |
| 2016/0006594 | A1 | 1/2016 | Persson et al. |
| 2016/0049997 | A1 | 2/2016 | Onodera et al. |
| 2017/0294926 | A1 | 10/2017 | Islam et al. |
| 2019/0319692 | A1* | 10/2019 | Noh ............... H04L 5/0048 |
| 2019/0380049 | A1* | 12/2019 | Hasegawa ......... H04L 5/0048 |
| 2021/0218523 | A1 | 7/2021 | Hao et al. |
| 2021/0234739 | A1* | 7/2021 | Matsumura .......... H04L 27/26 |

FOREIGN PATENT DOCUMENTS

| | | |
|---|---|---|
| CN | 104782066 A | 7/2015 |
| CN | 106452662 A | 2/2017 |
| EP | 3496292 A1 | 6/2019 |
| EP | 3579444 A1 | 12/2019 |
| TW | 201503621 A | 1/2015 |
| WO | WO-2013025558 A1 | 2/2013 |
| WO | WO-2013147764 A1 | 10/2013 |
| WO | WO-2015054201 A2 | 4/2015 |
| WO | WO-2017176602 A1 | 10/2017 |
| WO | WO-2018028256 A1 | 2/2018 |
| WO | WO-2018044715 A1 | 3/2018 |
| WO | WO-2018062833 A1 | 4/2018 |
| WO | WO-2018084239 A1 | 5/2018 |
| WO | WO-2018142506 A1 | 8/2018 |
| WO | WO-2018142860 A1 | 8/2018 |
| WO | WO-2020034110 A1 | 2/2020 |

OTHER PUBLICATIONS

Samsung: "Remaining Details on DMRS", 3GPP Draft, 3GPP TSG RAN WG1 Meeting 90bis, R1-1717630, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 2, 2017 (Oct. 2, 2017), XP051352248, 10 Pages, Retrieved from the Internet: URL: http://www.3gpp.org/ftp/tsg_ran/WG1_RL1/TSGR1_90b/Docs/ [Retrieved on Oct. 2, 2017] Section 3.
Supplementary Partial European Search Report—EP19850249—Search Authority—Munich—Apr. 21, 2022.
Mediatek Inc: "Considerations on Receiver Based Techniques for Interference Management", 3GPP TSG RAN WG1 Meeting #87, R1-1700157, Spokane, USA, Jan. 16-20, 2017, pp. 1-5.
Mediatek Inc: "Receiver Based Techniques for Interference Handling", 3GPP TSG RAN WG1 Meeting #88, R1-1702720, Athens, Greece Feb. 13-17, 2017, pp. 1-7.
Taiwan Search Report—TW108128925—TIPO—Mar. 2, 2023.
Qualcomm Incorporated: "Maintenance for CSX Measurement", 3GPP TSG RAN WG1 Meeting #93, R1-1807339, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018, pp. 1-9, XP051442531.
Supplementary European Search Report—EP19850249—Search Authority—Munich—Aug. 29, 2022.
Taiwan Search Report—TW108128925—TIPO—Aug. 30, 2022.
International Search Report and Written Opinion—PCT/CN2018/100478—ISA/EPO—May 15, 2019.
International Search Report and Written Opinion—PCT/CN2019/100318—ISA/EPO—Oct. 29, 2019.

* cited by examiner

INTERFERENCE LAYER CATEGORIZATION AND NON ZERO POWER INTERFERENCE MEASUREMENT RESOURCE FOR NON LINEAR PRECODING

CROSS REFERENCE TO RELATED APPLICATIONS

The present application is a 371 national phase filing of International Patent Application No. PCT/CN2019/100318 by Hao et. al., entitled "INTERFERENCE LAYER CATEGORIZATION AND NON ZERO POWER INTERFERENCE MEASUREMENT RESOURCE FOR NON LINEAR PRECODING," filed Aug. 13, 2019; and to International Patent Application No. PCT/CN2018/100478 by Hao et. al., entitled "INTERFERENCE LAYER CATEGORIZATION AND NON ZERO POWER INTERFERENCE MEASUREMENT RESOURCE FOR NON LINEAR PRECODING," filed Aug. 14, 2018, each of which is assigned to the assignee hereof and each of which is hereby incorporated by reference in its entirety.

BACKGROUND

The following relates generally to wireless communications, and more specifically to interference layer categorization and non-zero power (NZP) interference measurement resource (IMR) for non-linear precoding (NLP).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). Some wireless communications systems may support communications between base stations and UEs on multiple spatial layers. In such systems, a transmitting device may precode each data stream to be transmitted to a receiving device on a respective spatial layer to limit the interference between multiple data streams. Conventional techniques at a receiving device for equalizing precoded data streams received from a transmitting device may be deficient.

SUMMARY

The described techniques relate to improved methods, systems, devices, and apparatuses that support interference layer or resource categorization and interference measurement and reporting for non-linear precoding (NLP). In one aspect, the described techniques provide for identifying interference signals on multiple layers or resources and determining whether the interference signals transmitted on a particular layer or resource were precoded using linear precoding (LP) or NLP. In this aspect, a receiving device may equalize signals received from a transmitting device (e.g., filter out interference signals) based on determining whether the interference signals were precoded using a first type of precoding (e.g., linear precoding (LP)) or a second type of precoding (e.g., NLP). In another aspect, the described techniques provide for performing interference measurements on signals precoded using NLP based on categorizing interference resources as being precoded using LP or NLP. In this aspect, a receiving device may perform and report measurements differently for interference signals precoded using LP and interference signals precoded using NLP.

A method for wireless communication at a user equipment (UE) is described. The method may include receiving a configuration of a first one or more reference signal ports associated with at least one data stream for the UE, identifying a second one or more reference signal ports unassociated with the at least one data stream for the UE, receiving an indicator indicating a categorization of each of the second one or more reference signal ports as corresponding to one of a first type of layer or a second type of layer, receiving a transmission associated with the first one or more reference signal ports, and decoding the transmission to obtain the at least one data stream based on the categorization of the second one or more reference signal ports.

An apparatus for wireless communication at a UE is described. The apparatus may include a processor, memory in electronic communication with the processor, and instructions stored in the memory. The instructions may be executable by the processor to cause the apparatus to receive a configuration of a first one or more reference signal ports associated with at least one data stream for the UE, identify a second one or more reference signal ports unassociated with the at least one data stream for the UE, receive an indicator indicating a categorization of each of the second one or more reference signal ports as corresponding to one of a first type of layer or a second type of layer, receive a transmission associated with the first one or more reference signal ports, and decode the transmission to obtain the at least one data stream based on the categorization of the second one or more reference signal ports.

Another apparatus for wireless communication at a UE is described. The apparatus may include means for receiving a configuration of a first one or more reference signal ports associated with at least one data stream for the UE, identifying a second one or more reference signal ports unassociated with the at least one data stream for the UE, receiving an indicator indicating a categorization of each of the second one or more reference signal ports as corresponding to one of a first type of layer or a second type of layer, receiving a transmission associated with the first one or more reference signal ports, and decoding the transmission to obtain the at least one data stream based on the categorization of the second one or more reference signal ports.

A non-transitory computer-readable medium storing code for wireless communication at a UE is described. The code may include instructions executable by a processor to receive a configuration of a first one or more reference signal ports associated with at least one data stream for the UE, identify a second one or more reference signal ports unassociated with the at least one data stream for the UE, receive an indicator indicating a categorization of each of the second one or more reference signal ports as corresponding to one of a first type of layer or a second type of layer, receive a transmission associated with the first one or more reference signal ports, and decode the transmission to obtain the at least one data stream based on the categorization of the second one or more reference signal ports.

In some examples of the method, apparatuses, and non-transitory computer-readable medium described herein, the indicator may include operations, features, means, or instructions for identifying the categorization of each of the second one or more reference signal ports based on the one or more reference signal indexes of the first one or more reference signal ports. In some examples of the method, apparatuses, and non-transitory computer-readable medium described herein, identifying the categorization of each of the second one or more reference signal ports further may include operations, features, means, or instructions for determining the categorization of each port of the second one or more reference signal ports based on a comparison of an index of a respective port of the second one or more reference signal ports with the one or more reference signal indexes. In some examples of the method, apparatuses, and non-transitory computer-readable medium described herein, the indicator may include operations, features, means, or instructions for identifying the categorization of each of the second one or more reference signal ports based on the one or more reference signal indexes and the one or more group indexes.

In some examples of the method, apparatuses, and non-transitory computer-readable medium described herein, identifying the categorization of each of the second one or more reference signal ports further may include operations, features, means, or instructions for identifying the first one or more reference signal ports based on the one or more reference signal indexes and one or more configured groups of a set of groups based on the one or more group indexes, categorizing, within the one or more configured groups, each port of the second one or more reference signal ports as corresponding to the first type of layer, and categorizing, within each unconfigured group of the set of groups, each port of the second one or more reference signal ports as corresponding to the second type of layer. In some examples of the method, apparatuses, and non-transitory computer-readable medium described herein, the indicator may include operations, features, means, or instructions for identifying the categorization of each of the second one or more reference signal ports based on a respective bit within the bitmap.

In some examples of the method, apparatuses, and non-transitory computer-readable medium described herein, a number of bits in the bitmap corresponds to a number of the second one or more reference signal ports. In some examples of the method, apparatuses, and non-transitory computer-readable medium described herein, the indicator may include operations, features, means, or instructions for identifying a first configuration table and categorizing each of the second one or more reference signal ports as corresponding to one of the first type of layer or the second type of layer by indexing the first configuration table based on the row index. In some examples of the method, apparatuses, and non-transitory computer-readable medium described herein, identifying the first configuration table may include operations, features, means, or instructions for receiving an indication of the first configuration table. In some examples of the method, apparatuses, and non-transitory computer-readable medium described herein, receiving the indication of the first configuration table may include operations, features, means, or instructions for receiving the indication of the first configuration table in a radio resource control (RRC) message, a medium access control (MAC) control element (MAC-CE), or a downlink control information (DCI) message.

In some examples of the method, apparatuses, and non-transitory computer-readable medium described herein, the first configuration table includes a single configuration table accessible by the UE. In some examples of the method, apparatuses, and non-transitory computer-readable medium described herein, identifying the first configuration table may include operations, features, means, or instructions for identifying the first configuration table from a set of configuration tables based on a defined number of the first one or more reference signal ports, a defined number of layers associated with the first one or more reference signal ports, a defined number of layers associated with the second one or more reference signal ports, a defined number of the second one or more reference signal ports, or any combination thereof.

In some examples of the method, apparatuses, and non-transitory computer-readable medium described herein, the indicator may include operations, features, means, or instructions for identifying indexes of the first one or more reference signal ports based on the indicator, identifying a first configuration table of a set of configuration tables, and categorizing each of the second one or more reference signal ports as corresponding to one of the first type of layer or the second type of layer by indexing the first configuration table based on the identified indexes of the first one or more reference signal ports. In some examples of the method, apparatuses, and non-transitory computer-readable medium described herein, identifying the first configuration table may include operations, features, means, or instructions for receiving an indication of the first configuration table.

Some examples of the method, apparatuses, and non-transitory computer-readable medium described herein may further include operations, features, means, or instructions for receiving the indication of the first configuration table in an RRC message, a MAC-CE, or a DCI message. Some examples of the method, apparatuses, and non-transitory computer-readable medium described herein may further include operations, features, means, or instructions for receiving the indicator in an RRC message, a MAC-CE, or a DCI message. Some examples of the method, apparatuses, and non-transitory computer-readable medium described herein may further include operations, features, means, or instructions for transmitting a support indicator that indicates a defined number of the second one or more ports associated with the first type of layer, the second type of layer, or both, capable of being supported by the UE or a defined number of a second one or more layers of the first type, the second type, or both, capable of being supported by the UE.

Some examples of the method, apparatuses, and non-transitory computer-readable medium described herein may further include operations, features, means, or instructions for transmitting a support indicator that indicates a defined number of the first one or more ports associated with the first type of layer, the second type of layer, or both, capable of being supported by the UE or a defined number of a first one or more layers of the first type, the second type, or both, capable of being supported by the UE. In some examples of the method, apparatuses, and non-transitory computer-readable medium described herein, decoding the transmission further may include operations, features, means, or instructions for determining a parameter corresponding to a first port of the second one or more reference signal ports corresponding to the first type of layer and decoding the at least one data stream based on the parameter. In some examples of the method, apparatuses, and non-transitory computer-readable medium described herein, the first type of layer or the second type of layer may be a non-linear precoding layer. In some examples of the method, apparatuses, and non-transitory computer-readable medium described herein, the first type of layer or the second type of layer may be a linear precoding layer.

A method for wireless communication at a base station is described. The method may include transmitting a configuration of a first one or more reference signal ports associated with at least one data stream for a UE, the first one or more reference signal ports being different from a second one or more reference signal ports unassociated with the at least one data stream for the UE, transmitting an indicator indicating a categorization of each of the second one or more reference signal ports as corresponding to one of a first type of layer or a second type of layer, and transmitting the at least one data stream using the first one or more reference signal ports.

An apparatus for wireless communication at a base station is described. The apparatus may include a processor, memory in electronic communication with the processor, and instructions stored in the memory. The instructions may be executable by the processor to cause the apparatus to transmit a configuration of a first one or more reference signal ports associated with at least one data stream for a UE, the first one or more reference signal ports being different from a second one or more reference signal ports unassociated with the at least one data stream for the UE, transmit an indicator indicating a categorization of each of the second one or more reference signal ports as corresponding to one of a first type of layer or a second type of layer, and transmit the at least one data stream using the first one or more reference signal ports.

Another apparatus for wireless communication at a base station is described. The apparatus may include means for transmitting a configuration of a first one or more reference signal ports associated with at least one data stream for a UE, the first one or more reference signal ports being different from a second one or more reference signal ports unassociated with the at least one data stream for the UE, transmitting an indicator indicating a categorization of each of the second one or more reference signal ports as corresponding to one of a first type of layer or a second type of layer, and transmitting the at least one data stream using the first one or more reference signal ports.

A non-transitory computer-readable medium storing code for wireless communication at a base station is described. The code may include instructions executable by a processor to transmit a configuration of a first one or more reference signal ports associated with at least one data stream for a UE, the first one or more reference signal ports being different from a second one or more reference signal ports unassociated with the at least one data stream for the UE, transmit an indicator indicating a categorization of each of the second one or more reference signal ports as corresponding to one of a first type of layer or a second type of layer, and transmit the at least one data stream using the first one or more reference signal ports.

In some examples of the method, apparatuses, and non-transitory computer-readable medium described herein, the indicator includes one or more reference signal indexes, one or more group indexes, one or more row indexes, one or more group table indexes, one or more port indexes, or any combination thereof. In some examples of the method, apparatuses, and non-transitory computer-readable medium described herein, the indicator may include operations, features, means, or instructions for transmitting an indication of a configuration table to be referenced by the UE using the one or more row indexes. In some examples of the method, apparatuses, and non-transitory computer-readable medium described herein, transmitting the indication of the configuration table may include operations, features, means, or instructions for transmitting the indication of the configuration table in an RRC message, a MAC-CE, or a DCI message.

In some examples of the method, apparatuses, and non-transitory computer-readable medium described herein, the indicator includes a bitmap. In some examples of the method, apparatuses, and non-transitory computer-readable medium described herein, a number of bits in the bitmap corresponds to a number of the second one or more reference signal ports. In some examples of the method, apparatuses, and non-transitory computer-readable medium described herein, the indicator indicates a first configuration table of a set of configuration tables based on a defined number of the first one or more reference signal ports, a defined number of layers associated with the first one or more reference signal ports, a defined number of layers associated with the second one or more reference signal ports, a defined number of the second one or more reference signal ports, or any combination thereof.

Some examples of the method, apparatuses, and non-transitory computer-readable medium described herein may further include operations, features, means, or instructions for transmitting the indicator in an RRC message, a MAC-CE, or a DCI message. Some examples of the method, apparatuses, and non-transitory computer-readable medium described herein may further include operations, features, means, or instructions for receiving a support indicator that indicates a defined number of the second one or more ports associated with the first type of layer, the second type of layer, or both, capable of being supported by the UE or a defined number of a second one or more layers of the first type, the second type, or both, capable of being supported by the UE.

Some examples of the method, apparatuses, and non-transitory computer-readable medium described herein may further include operations, features, means, or instructions for receiving a support indicator that indicates a defined number of the first one or more ports associated with the first type of layer, the second type of layer, or both, capable of being supported by the UE or a defined number of a first one or more layers of the first type, the second type, or both, capable of being supported by the UE. In some examples of the method, apparatuses, and non-transitory computer-readable medium described herein, the first type of layer or the second type of layer may be a non-linear precoding layer. In some examples of the method, apparatuses, and non-transitory computer-readable medium described herein, the first type of layer or the second type of layer may be a linear precoding layer.

A method for wireless communication at a UE is described. The method may include receiving a configuration of a first one or more CSI reference signal (CSI-RS) resources for channel measurement and a configuration of a second one or more CSI-RS resources for interference measurement, receiving an indicator indicating a categorization of each port used to transmit on the second one or more CSI-RS resources for interference measurement as corresponding to one of a first type of layer or a second type of layer, and transmitting a CSI report based on the configuration of the first one or more CSI-RS resources, the configuration of the second one or more CSI-RS resources, and the categorization.

An apparatus for wireless communication at a UE is described. The apparatus may include a processor, memory in electronic communication with the processor, and instructions stored in the memory. The instructions may be executable by the processor to cause the apparatus to receive a configuration of a first one or more CSI-RS resources for channel measurement and a configuration of a second one or more CSI-RS resources for interference measurement, receive an indicator indicating a categorization of each port used to transmit on the second one or more CSI-RS resources for interference measurement as corresponding to one of a first type of layer or a second type of layer, and transmit a CSI report based on the configuration of the first one or more CSI-RS resources, the configuration of the second one or more CSI-RS resources, and the categorization.

Another apparatus for wireless communication at a UE is described. The apparatus may include means for receiving a configuration of a first one or more CSI-RS resources for channel measurement and a configuration of a second one or more CSI-RS resources for interference measurement, receiving an indicator indicating a categorization of each port used to transmit on the second one or more CSI-RS resources for interference measurement as corresponding to one of a first type of layer or a second type of layer, and transmitting a CSI report based on the configuration of the first one or more CSI-RS resources, the configuration of the second one or more CSI-RS resources, and the categorization.

A non-transitory computer-readable medium storing code for wireless communication at a UE is described. The code may include instructions executable by a processor to receive a configuration of a first one or more CSI-RS resources for channel measurement and a configuration of a second one or more CSI-RS resources for interference measurement, receive an indicator indicating a categorization of each port used to transmit on the second one or more CSI-RS resources for interference measurement as corresponding to one of a first type of layer or a second type of layer, and transmit a CSI report based on the configuration of the first one or more CSI-RS resources, the configuration of the second one or more CSI-RS resources, and the categorization.

In some examples of the method, apparatuses, and non-transitory computer-readable medium described herein, each of the first one or more CSI-RS resources and the second one or more CSI-RS resources may be a non-zero power reference signal resource. Some examples of the method, apparatuses, and non-transitory computer-readable medium described herein may further include operations, features, means, or instructions for transmitting a support indicator that indicates a defined number of ports associated with the first type of layer in the second one or more CSI-RS resources, the second type of layer in the second one or more CSI-RS resources, or both, capable of being supported by the UE. In some examples of the method, apparatuses, and non-transitory computer-readable medium described herein, the report indicates CSI determined based on the channel measurement, one or more of the interference measurements, or both.

In some examples of the method, apparatuses, and non-transitory computer-readable medium described herein, the indicator may include operations, features, means, or instructions for identifying the categorization of each port used to transmit on the second one or more CSI-RS resources based on the one or more indexes of the first one or more CSI-RS resources. Some examples of the method, apparatuses, and non-transitory computer-readable medium described herein may further include operations, features, means, or instructions for determining that all ports used to transmit on a same resource of the second one or more CSI-RS resources may have a same categorization and determining the categorization of each port used to transmit on each CSI-RS resource of the second one or more CSI-RS resources based on a comparison of an index of a respective CSI-RS resource with the one or more indexes of the first one or more CSI-RS resources.

In some examples of the method, apparatuses, and non-transitory computer-readable medium described herein, the indicator may include operations, features, means, or instructions for determining that all ports used to transmit on a same resource of the second one or more CSI-RS resources may have a same categorization and identifying the categorization of each port used to transmit on each CSI-RS resource of the second one or more CSI-RS resources based on the bitmap, where a number of bits in the bitmap may be equal to a number of resources of the second one or more CSI-RS resources. In some examples of the method, apparatuses, and non-transitory computer-readable medium described herein, the indicator may include operations, features, means, or instructions for identifying the categorization of each port used to transmit on each CSI-RS resource of the second one or more CSI-RS resources based on the bitmap, where the number of bits in the bitmap may be equal to a number of ports used to transmit on all of the second one or more CSI-RS resources.

In some examples of the method, apparatuses, and non-transitory computer-readable medium described herein, the indicator may include operations, features, means, or instructions for identifying a code division multiplexing (CDM) type applied for transmission on each resource of the second one or more CSI-RS resources, determining that all ports used to transmit on a resource of the second one or more CSI-RS resources associated with a same CDM group may have a same categorization and determining the categorization based on a bitmap, where a number of bits in the bitmap may be equal to a number of CDM groups applied for transmission on all of the second one or more CSI-RS resources.

In some examples of the method, apparatuses, and non-transitory computer-readable medium described herein, the indicator may include operations, features, means, or instructions for identifying a first configuration table of a set of configuration tables and categorizing each port used to transmit on each of the second one or more CSI-RS resources as corresponding to one of the first type of layer or the second type of layer by indexing the first configuration table based on the row index. Some examples of the method, apparatuses, and non-transitory computer-readable medium described herein may further include operations, features, means, or instructions for identifying the first configuration table may be based on a number of the second one or more CSI-RS resources.

In some examples of the method, apparatuses, and non-transitory computer-readable medium described herein, the indicator may include operations, features, means, or instructions for identifying indexes of the first one or more CSI-RS resources based on the indicator, identifying a first configuration table of a set of configuration tables, and categorizing each port used to transmit on each of the second one or more CSI-RS resources as corresponding to one of the first type of layer or the second type of layer by indexing the first configuration table based on the identified indexes of the first one or more CSI-RS resources.

In some examples of the method, apparatuses, and non-transitory computer-readable medium described herein, receiving the indicator further may include operations, features, means, or instructions for receiving at least one of a RRC message, a medium access control (MAC) control element (MAC-CE), or a DCI message indicating that each port used to transmit each of the second one or more CSI-RS resources corresponds to the first type of layer or the second type of layer. Some examples of the method, apparatuses, and non-transitory computer-readable medium described herein may further include operations, features, means, or instructions for determining one or more parameters based on the first one or more CSI-RS resources, the second one or more CSI-RS resources, and the categorization, where the CSI report includes the one or more parameters. In some examples of the method, apparatuses, and non-transitory computer-readable medium described herein, the CSI report includes at least a channel quality indicator (CQI) and the CQI may be computed based on the one or more parameters.

In some examples of the method, apparatuses, and non-transitory computer-readable medium described herein, determining the one or more parameters further may include operations, features, means, or instructions for generating the channel measurement based on measuring the first one or more CSI-RS resources, generating a first interference measurement based on measuring the second one or more CSI-RS resources categorized as corresponding to the first type of layer, generating a second interference measurement based on measuring the second one or more CSI-RS resources categorized as corresponding to the second type of layer and determining the one or more parameters based on the channel measurement, the first interference measurement, and the second interference measurement.

In some examples of the method, apparatuses, and non-transitory computer-readable medium described herein, each of the one or more parameters indicates a measurement of interference from an interference layer corresponding to a port of the second one or more CSI-RS resources on a port of the first one or more CSI-RS resources. In some examples of the method, apparatuses, and non-transitory computer-readable medium described herein, reporting a parameter of the one or more parameters may include operations, features, means, or instructions for reporting an amplitude and phase of the parameter.

In some examples of the method, apparatuses, and non-transitory computer-readable medium described herein, reporting the amplitude and phase of a parameter of the one or more parameters may include operations, features, means, or instructions for reporting the amplitude and phase of the parameter of the one or more parameters corresponding to a defined bandwidth. In some examples of the method, apparatuses, and non-transitory computer-readable medium described herein, reporting the amplitude and phase of a parameter of the one or more parameters may include operations, features, means, or instructions for reporting a first value corresponding to a defined bandwidth and a second value corresponding to a portion of the defined bandwidth, where the second value.

A method for wireless communication at a base station is described. The method may include transmitting a configuration of a first one or more CSI-RS resources for channel measurement and a configuration of a second one or more CSI-RS resources for interference measurement, transmitting an indicator indicating a categorization of each port used to transmit on the second one or more CSI-RS resources for interference measurement as corresponding to one of a first type of interference layer or a second type of interference layer, transmitting CSI-RSs in each of the first one or more CSI-RS resources and the second one or more CSI-RS resources in accordance with the indicator, and receiving a report based on the categorization.

An apparatus for wireless communication at a base station is described. The apparatus may include a processor, memory in electronic communication with the processor, and instructions stored in the memory. The instructions may be executable by the processor to cause the apparatus to transmit a configuration of a first one or more CSI-RS resources for channel measurement and a configuration of a second one or more CSI-RS resources for interference measurement, transmit an indicator indicating a categorization of each port used to transmit on the second one or more CSI-RS resources for interference measurement as corresponding to one of a first type of interference layer or a second type of interference layer, transmit CSI-RSs in each of the first one or more CSI-RS resources and the second one or more CSI-RS resources in accordance with the indicator, and receive a report based on the categorization.

Another apparatus for wireless communication at a base station is described. The apparatus may include means for transmitting a configuration of a first one or more CSI-RS resources for channel measurement and a configuration of a second one or more CSI-RS resources for interference measurement, transmitting an indicator indicating a categorization of each port used to transmit on the second one or more CSI-RS resources for interference measurement as corresponding to one of a first type of interference layer or a second type of interference layer, transmitting CSI-RSs in each of the first one or more CSI-RS resources and the second one or more CSI-RS resources in accordance with the indicator, and receiving a report based on the categorization.

A non-transitory computer-readable medium storing code for wireless communication at a base station is described. The code may include instructions executable by a processor to transmit a configuration of a first one or more CSI-RS resources for channel measurement and a configuration of a second one or more CSI-RS resources for interference measurement, transmit an indicator indicating a categorization of each port used to transmit on the second one or more CSI-RS resources for interference measurement as corresponding to one of a first type of interference layer or a second type of interference layer, transmit CSI-RSs in each of the first one or more CSI-RS resources and the second one or more CSI-RS resources in accordance with the indicator, and receive a report based on the categorization.

Some examples of the method, apparatuses, and non-transitory computer-readable medium described herein may further include operations, features, means, or instructions for receiving a support indicator that indicates a defined number of ports associated with the first type of layer in the second one or more CSI-RS resources, the second type of layer in the second one or more CSI-RS resources, or both, capable of being supported by a UE. In some examples of the method, apparatuses, and non-transitory computer-readable medium described herein, the first type of layer or the second type of layer may be a non-linear precoding layer. In some examples of the method, apparatuses, and non-transitory computer-readable medium described herein, the first type of layer or the second type of layer may be a linear precoding layer. In some examples of the method, apparatuses, and non-transitory computer-readable medium described herein, the report indicates a parameter determined based on the CSI-RSs and the categorization.

In some examples of the method, apparatuses, and non-transitory computer-readable medium described herein, the report includes at least a channel quality indicator (CQI) and the CQI may be computed based on the parameter. In some examples of the method, apparatuses, and non-transitory computer-readable medium described herein, the report indicates an amplitude and phase of the parameter. In some examples of the method, apparatuses, and non-transitory computer-readable medium described herein, the report indicates an amplitude and phase of the parameter corresponding to a defined bandwidth. In some examples of the method, apparatuses, and non-transitory computer-readable medium described herein, the report indicates a first value corresponding to a defined bandwidth and a second value corresponding to a portion of the defined bandwidth. In some cases, the second value includes an offset relative to the first value.

In some examples of the method, apparatuses, and non-transitory computer-readable medium described herein, the indicator includes one or more CSI-RS resource indexes, one or more group indexes, one or more row indexes, one or more group table indexes, or any combination thereof. In some examples of the method, apparatuses, and non-transitory computer-readable medium described herein, the indicator includes a bitmap. In some examples of the method, apparatuses, and non-transitory computer-readable medium described herein, a number of bits in the bitmap corresponds to a number of interference layers. In some examples of the method, apparatuses, and non-transitory computer-readable medium described herein, the indicator indicates a first configuration table of a set of configuration tables based on a number of the second one or more CSI-RS resources.

DETAILED DESCRIPTION

Some wireless communications systems may support communications between base stations and user equipment (UE) on multiple spatial layers. In such systems, a base station may transmit multiple spatial streams to multiple UEs, where each spatial stream may be precoded using linear precoding (LP) or non-linear precoding (NLP) in an encoding procedure to limit the interference between the spatial streams. After the encoding procedure, the base station may transmit the multiple spatial streams to the UEs, and each UE may attempt to derive its respective spatial stream by equalizing the signals received from the base station to filter out interfering spatial streams. In some cases, however, in order for a UE to equalize signals received from a base station to identify its respective spatial stream, it may be appropriate for the UE to identify which of the interfering spatial streams were encoded using LP and which of the interfering spatial streams were encoded using NLP. That is, it may be appropriate for the UE to categorize the interference layers.

As described herein, a wireless communications system may support efficient techniques for indicating the categorization of interference layers to a UE. Accordingly, the UE may be able to equalize signals received from a base station (e.g., filter out interference signals) based on determining whether interfering spatial streams were precoded using LP or NLP. Additionally, for channel state information (CSI) reporting, once the UE is able to identify the categorization of different interference layers or interference resources, the UE may be able to provide useful, specialized feedback to a base station for different interference layers or interference resources based on determining whether signals on the interference layers of interference resources were encoded using LP or NLP.

Aspects of the disclosure introduced above are described below in the context of a wireless communications system. Examples of processes and signaling exchanges that support interference layer categorization and non-zero power (NZP) interference measurement resource (IMR) for NLP are then described. Aspects of the disclosure are further illustrated by and described with reference to apparatus diagrams, system diagrams, and flowcharts that relate to interference layer categorization and NZP IMR for NLP.

Figure 1:
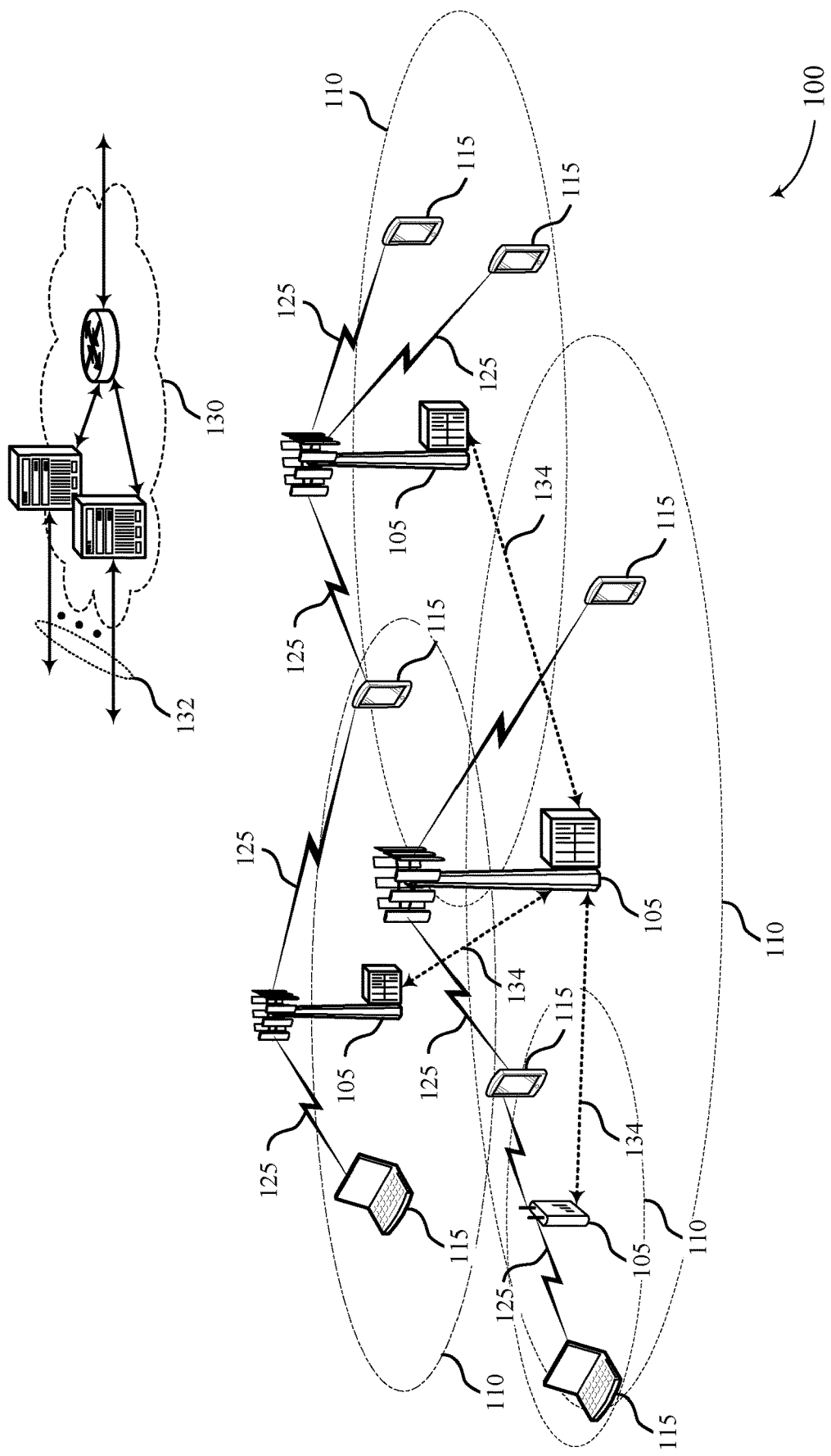
FIG. 1 illustrates an example of a wireless communications system that supports interference layer categorization and non-zero power (NZP) interference measurement resource (IMR) for non-linear precoding (NLP) in accordance with aspects of the present disclosure.

FIG. 1 illustrates an example of a wireless communications system 100 that supports interference layer categorization and NZP IMR for NLP in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

A base station 105 in wireless communications system 100 may transmit demodulation reference signals (DMRSs) in a downlink channel to a UE 115, and the UE 115 may use the DMRSs to perform channel estimation to decode data in the downlink channel. When multiple spatial layers are used for a downlink transmission, the DMRSs for a specific UE may be transmitted on a same port used to transmit the data stream to the UE. In some cases, a base station 105 may transmit a DMRS configuration (e.g., an index to a table) to a UE 115 in downlink control information (DCI) (e.g., DCI format 1_1) which may indicate a number of DMRS code division multiplexing (CDM) groups without data and the DMRS port used to transmit DMRSs for the UE 115. Table 1 is an example of a table that a UE 115 may reference to determine a DMRS configuration based on an index included in DCI from a base station 105.

TABLE 1

DMRS Configuration Table
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

Different tables may indicate the DMRS configuration for different numbers of codewords, different types of DMRS, etc. As an example, a first type of DMRS may be associated with a FD-TD orthogonal cover code (OCC) and a comb level of 2 (e.g., four ports for one symbol or eight ports for two symbols) and a second type of DMRS may be associated with a circular shift (CS) of 4 (i.e., CS4) and a comb level of three (e.g., six ports for one symbol or twelve ports for two symbols).

Further, a UE 115 in wireless communications system 100 may be configured to transmit CSI reports to a base station 105. CSI reports may include information for a base station 105 to use to determine appropriate configurations for communicating with a UE 115. A base station 105 may transmit CSI reference signals (CSI-RSs) which a receiving UE 115 may use to generate a CSI report to be transmitted to the base station 105. In some wireless communications systems, various resource settings may be configured for CSI-RSs and CSI reporting. The resource settings may indicate configurations for CSI-RS transmissions and for CSI reporting. A particular resource setting may be associated with or may include multiple resource sets (e.g., resource set 0, resource set 1, etc.), and each resource set may be associated with or may include multiple CSI resources (e.g., resource 0, resource 1, etc.), where the CSI resources correspond to a group of CSI-RS ports used to transmit CSI-RSs and the mapping of the CSI-RSs to physical resources.

In some aspects, a UE 115 may be configured with up to three resource settings for a CSI report. For instance, the UE 115 may be configured with a non-zero power (NZP) CSI-RS resource setting for channel measurement (CM), a CSI interference measurement (CSI-IM) resource setting for interference measurement, and an NZP CSI-RS resource setting for IMR. When a UE 115 is configured with one CSI report setting associated with three resource settings, a single NZP CSI-RS resource set may be activated or triggered for CM, a single CSI-IM resources may be activated or triggered, and a single NZP CSI-RS resource set with multiple NZP CSI-RS resources for IM may be triggered or activated. Further, when computing the CSI report, the UE 115 may consider all ports corresponding to or included in the triggered NZP CSI-RS resource set for IM. In an example, a base station 105 may perform a multi-user transmission for four UEs 115, and the base station 105 may define four NZP CSI-RS resources (e.g., resource 0, resource 1, resource 2, and resource 3). In this or other examples, one NZP resource may be used for CM for each UE 115, and the other three resources may be used for IM (e.g., for UE 0, resource 0 may be used for CM and resources 1, 2, and 3 may be used for IM). Thus, each UE may perform a CSI calculation using the configured NZP CMR and NZP IMR.

In wireless communications system 100, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing.

The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Figure 2:
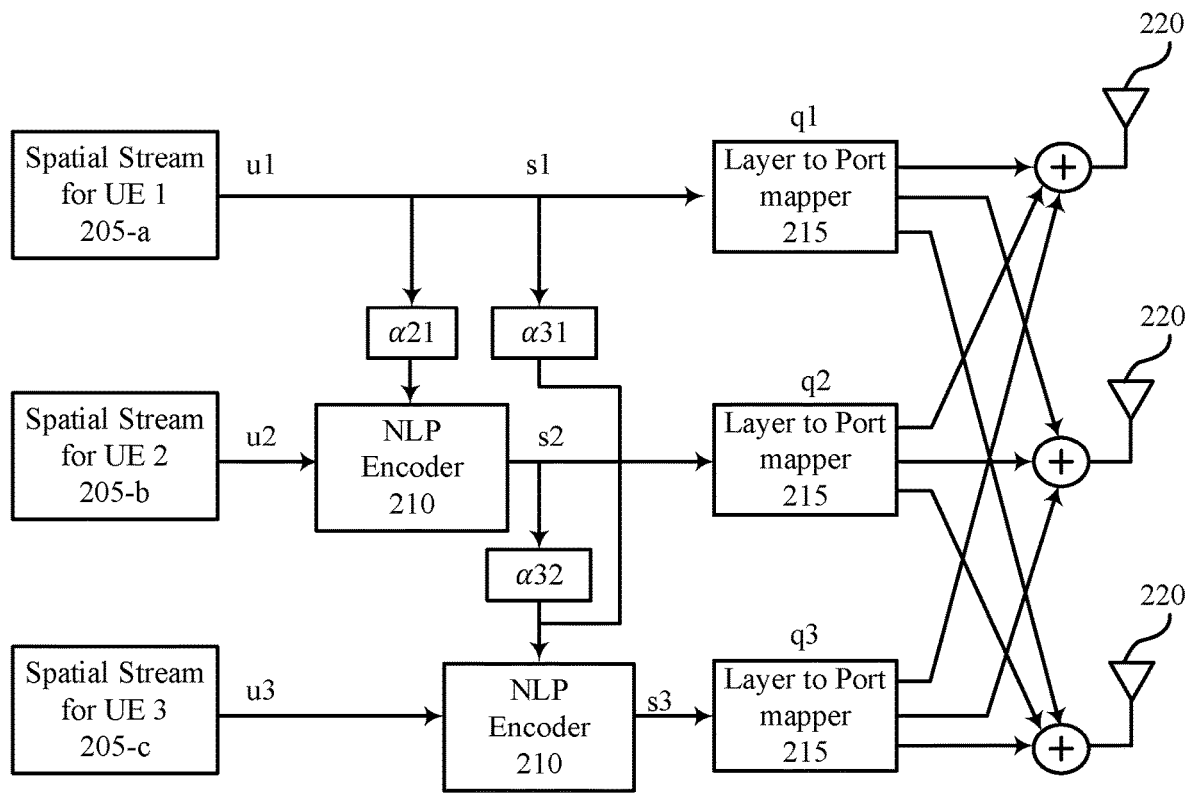
FIG. 2 illustrates an example of an encoding procedure in accordance with aspects of the present disclosure.

To limit the interference between spatial streams in a downlink transmission, a base station 105 may precode each spatial stream using LP or NLP during an encoding procedure. FIG. 2 illustrates an example of an encoding procedure 200 in accordance with aspects of the present disclosure. In the example of FIG. 2, the base station 105 may be scheduled to transmit a first spatial stream 205-a carrying data for a first UE 115, a second spatial stream 205-b carrying data for a second UE 115, and a third spatial stream 205-c carrying data for a third UE 115. Accordingly, the base station 105 may encode each spatial stream prior to transmission to the UEs 115. As part of the encoding process 200, the base station 105 may perform LP on each spatial stream by applying a linear precoding weight to each spatial stream. In particular, the base station 105 may apply a weighting of q1 to the first spatial stream 205-a, q2 to the second spatial stream 205-b, and q3 to the third spatial stream 205-c.

In addition to the LP weighting, the base station 105 may also perform NLP on the second spatial stream 205-b and the third spatial stream 205-c using an NLP encoder 210. The NLP encoder 210 may take a spatial stream and the interference from other spatial streams as input to generate a precoded spatial stream. For instance, NLP encoder 210 may take the second spatial stream 205-b and a measurement of the interference from the first spatial stream 205-a (e.g., the parameter $\alpha_{21}$) as input to generate a precoded spatial stream for the second spatial stream 205-b. Similarly, NLP encoder 210 may take the third spatial stream 205-c and a measurement of the interference from the first spatial stream 205-a (e.g., parameter $\alpha_{31}$) and the second spatial stream 205-b (e.g., parameter $\alpha_{32}$) as input to generate a precoded spatial stream for the third spatial stream 205-c.

During an encoding process, the NLP encoder may attempt to pre-cancel the potential interference from spatial layer 205-a on spatial layer 205-b by subtracting $u_1 \times \alpha_{21}$ from $u_2$. Similarly, the NLP encoder may attempt to pre-cancel the potential interference from spatial layers 205-a and 205-b on spatial layer 205-c by subtracting $s_2 \times \alpha_{32}$ and $u_1 \times \alpha_{31}$ from $u_3$. The transmitter may perturb a constellation symbol, associated with the spatial stream to one of the receivers to account for the potential interference. The perturbed constellation symbol may be far away from the origin. Such power consumption may exceed the total power transmission limit so that power normalization has to be applied. In this case, the received signal strength may be decreased due to the power normalization. To limit the transmission power to a power constraint, the NLP encoder may perform a modulo operation. The modulo operation returns the remainder of an input number divided by a divider. The divider is known as the modulo base.

Mathematically, for a second UE 115, the output of the modulo operation can be expressed by $x_2 = u_2 - \alpha_{21} \times u_1 + d \times \tau_2$, where $\tau_2$ is the modulo base and d is an integer (positive, zero or negative), the output $x_2$ is a value between $$-\frac{\tau_2}{2}$$

and $$\frac{\tau_2}{2}.$$

In some cases, $u_2 - \alpha_{21} \times u_1$ are complex numbers, and the modulo operation is performed by real/image dimension, i.e., $\text{Re}\{x_2\} = \text{Re}\{u_2 - \alpha_{21} \times u_1\} + d_I \times \tau_2$ and $\text{Im}\{x_2\} = \text{Im}\{u_2 - \alpha_{21} \times u_1\} + d_Q \times \tau_2$. Further, for a third UE 115, the output of the modulo operation can be expressed by $x_3 = u_3 - \alpha_{31} \times u_1 - \alpha_{32} \times s_2 + d_3 \times \tau_3$, where $\tau_3$ is the modulo base and d is an integer (positive, zero or negative), the output $x_3$ is a value between $$-\frac{\tau_3}{2}$$

and $$\frac{\tau_3}{2}.$$

In some cases, $u_3 - \alpha_{31} \times u_1 - \alpha_{32} \times s_2$ are complex numbers, and the modulo operation is performed by real/image dimension, i.e., $\text{Re}\{x_3\} = \text{Re}\{u_3 - \alpha_{31} \times u_1 - \alpha_{32} \times s_2\} + d_I \times \tau_3$ and $\text{Im}\{x_3\} = \text{Im}\{u_3 - \alpha_{31} \times u_1 - \alpha_{32} \times s_2\} + d_Q \times \tau_3$. Once the spatial streams are encoded, the base station 105 may then map each layer to a port using layer to port mapper 215, and the precoded spatial streams may be transmitted by antennas 220.

Figure 3:
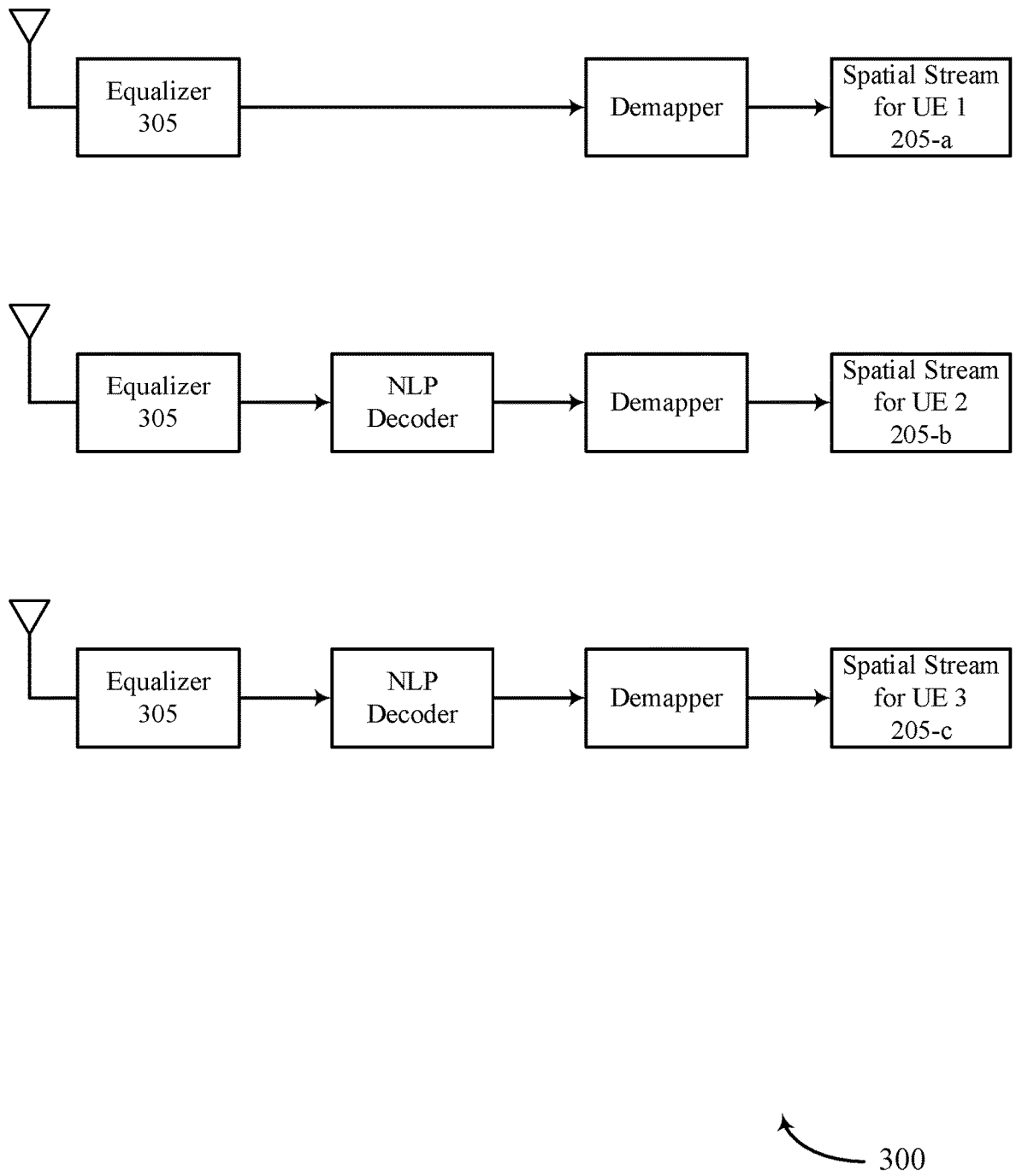
FIG. 3 illustrates an example of a procedure at a user equipment (UE) for deriving a spatial stream intended for the UE in accordance with aspects of the present disclosure.

The spatial streams may then be received by the three UEs 115, and each UE 115 may attempt to derive its respective spatial stream. FIG. 3 illustrates an example of a procedure 300 at a UE 115 for deriving its respective spatial stream in accordance with aspects of the present disclosure. In the example of FIG. 3, each UE 115 may receive its respective spatial stream and may also overhear (or receive interference from) other spatial streams intended for other UEs 115. Each UE 115 may then attempt to equalize or filter the signals received using an equalizer 310 to identify the specific signals intended for the UE 115. In order for a UE 115 to equalize the receive signals to identify its respective spatial stream, it may be appropriate for the UE 115 to identify the interfering spatial streams and determine which of the interfering spatial streams were nulled out using LP and which of the interfering spatial streams were cancelled using NLP.

As an example, for a UE k, the interference from UE 1 to UE k−1 may be cancelled using NLP (i.e., by factoring in the values of $\alpha_{k,1}, \ldots \alpha_{k,k-1}$) and the interference from UE k+1 to UE K may be cancelled using LP (i.e., by applying ZeroForcing-like weights of $q_{k+1} \ldots q_K$) in a transmission from base station 105. In this or other examples, for a minimum mean-squared error (MMSE) equalizer, UE k may equalize signals received from the base station 105 based on the following equation:

$$w_{mmse,k} = \frac{\left(h_k^H q_k + \sum_{j=1}^{k-1} h_k^H q_j \alpha_{kj}\right) \times \frac{P}{K}}{\sigma_n^2 + \sum_{j=1}^{K} |h_k^H q_j|^2 \times \frac{P}{K}} \quad (1)$$

As can be seen in the equation, in order for UE k to equalize the signals to identify its respective spatial stream, the equalizer 310 may perform certain calculations for interfering spatial streams encoded using NLP (i.e., $\Sigma_{j=1}^{k-1} h_k^H q_j \alpha_{kj}$). Thus, the UE 115 would not be able to equalize the signals received from base station 105 properly without determining which layers include spatial streams encoded using LP and which layers include spatial streams encoded using NLP (i.e., without categorizing the interference layers). Wireless communications system 100 may support efficient techniques for configuring a UE 115 to categorize interference layers such that the UE 115 may be able to equalize signals received from a base station 105. Once the UE 115 is able to equalize the transmission, the UE 115 may decode and de-map the equalized signals to identify its respective spatial stream 205.

Figure 4:
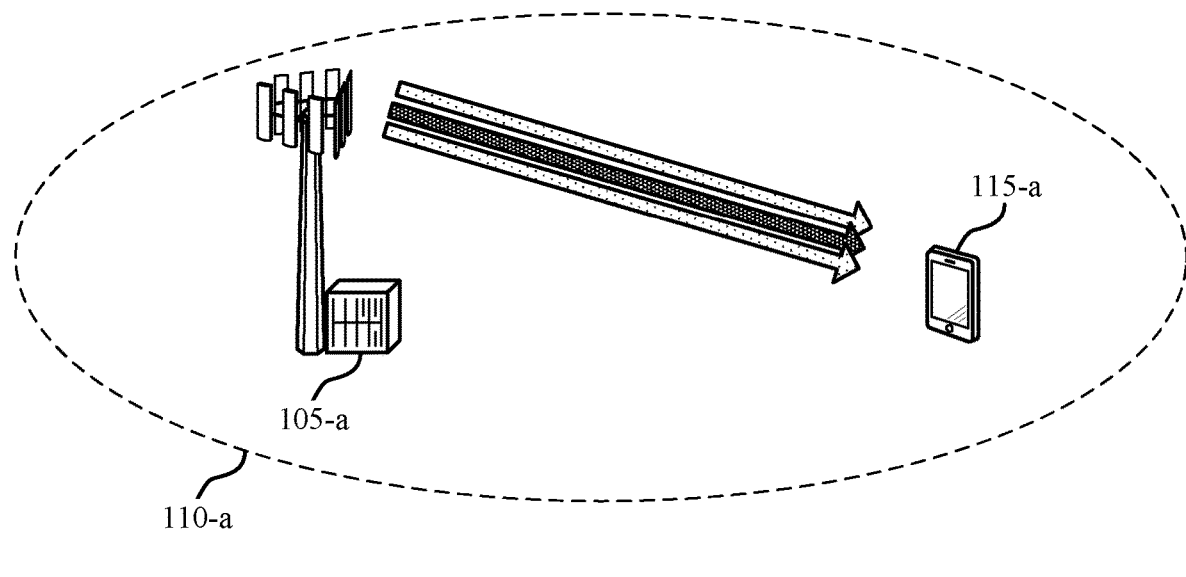
FIGS. 4 and 5 illustrate examples of wireless communications systems that support interference layer categorization and NZP IMR for NLP in accordance with aspects of the present disclosure.

FIG. 4 illustrates an example of a wireless communications system 400 that supports interference layer categorization in accordance with aspects of the present disclosure. Wireless communications system 400 includes base station 105-a, which may be an example of a base station 105 described with reference to FIGS. 1-3. Wireless communications system 400 also includes UE 115-a, which may be an example of a UE 115 described with reference to FIGS. 1-3. Base station 105-a may provide communication coverage for a respective coverage area 110-a, which may be an example of a coverage area 110 described with reference to FIG. 1. Wireless communications system 400 may implement aspects of wireless communications system 100. For example, wireless communications system may support efficient techniques for configuring UE 115-a to categorize interference layers such that UE 115-a may be able to equalize and decode signals received from base station 105-a.

In the example of FIG. 4, base station 105-a may generate and transmit multiple data streams 410 on multiple spatial layers for multiple UEs 115. UE 115-a may receive the data stream intended for UE 115-a (e.g., transmitted on a first one or more ports) with interference from other interfering data streams 410 intended for other UEs 115 (e.g., transmitted on a second one or more ports), and UE 115-a and may attempt to equalize (e.g., filter) the received signals to identify its respective data stream 405. In order to equalize the received signals, it may be appropriate for UE 115-a to determine which of the interfering data streams 410 were nulled out using LP and which of the interfering data streams 410 were cancelled using NLP. As described herein, base station 105-a may support techniques for indicating to UE 115-a (e.g., explicitly or implicitly using an indicator) which of the interfering data streams 410 were nulled out using LP and which of the interfering data streams 410 were cancelled using NLP (i.e., a categorization of the second one or more ports as corresponding to a first type of layer or a second type of layer).

In some aspects, base station 105-a may transmit a DMRS configuration indication to UE 115-a which may indicate a configuration for receiving DMRSs intended for UE 115-a, and UE 115-a may use the DMRS configuration indication to determine which of the interfering data streams 410 were nulled out using LP and which of the interfering data streams 410 were cancelled using NLP. Thus, the DMRS configuration may also serve as an indication of which of the interfering data streams 410 were nulled out using LP and which of the interfering data streams 410 were cancelled using NLP. As described above with reference to FIG. 1, the DMRS configuration may indicate a number of configured DMRS CDM groups without data and the index of the DMRS port used to transmit DMRSs to a particular UE 115. The configured DMRS CDM groups may contain potential co-scheduled DMRSs for other UEs 115 in a multi-user case (e.g., unless the index indicates a specific pattern, such as indexes 2, 9, 10, and 11). UE 115-a may use the indication of the number of DMRS CDM groups without data and/or the index of the DMRS port used to transmit DMRSs to UE 115-a to determine which of the interfering data streams 410 were encoded using LP and which of the data streams 410 were encoded using NLP.

In one example, UE 115-a may identify the indexes of a first set of DMRS ports used to transmit DMRSs and the data stream 405 to UE 115-a (e.g., DMRS port k) based on the DMRS configuration and the indexes of a second set of DMRS ports used to transmit DMRSs and the interfering data streams 410 to other UEs (e.g., DMRS ports in a set S) based on the DMRS CDM groups indicated by the DMRS configuration. And UE 115-a may categorize the layers associated with the second set of DMRS ports based on the indexes of the first set of DMRS ports and the indexes of the second set of DMRS ports. In particular, UE 115-a may determine that all DMRS ports in the second set of DMRS ports with indexes smaller than the indexes of the first set of DMRS ports may be associated with NLP layers, and UE 115-a may determine that all DMRS ports in the second set of DMRS ports with indexes larger than the index of the first set of DMRS ports may be associated with LP layers.

For instance, if UE 115-a receives a DMRS configuration with a value of four (i.e., corresponding to pattern four in Table 1), UE 115-a may determine that the first set of DMRS ports includes DMRS port 1 (e.g., k=1). UE 115-a may also determine (e.g., based on the DMRS configuration indicating that there are two DMRS CDM groups) that the second set of DMRS ports include DMRS ports with indexes zero, two, and three (e.g., S={0, 2, 3}). Accordingly, UE 115-a may determine that the data stream transmitted on DMRS port 0 was encoded using NLP or was transmitted on an NLP layer (e.g., since the index of DMRS port 0 is less than the index of DMRS port 1) and data streams transmitted on DMRS ports 2 and 3 were encoded using LP or transmitted on LP layers (e.g., since the indexes of DMRS ports 2 and 3 are greater than the index of DMRS port 1).

In another example, UE 115-a may identify the indexes of a first set of DMRS ports used to transmit DMRSs and data stream 405 to UE 115-a (e.g., DMRS port k), the indexes of a second set of DMRS ports used to transmit DMRSs and interfering data streams 410 to other UEs (e.g., DMRS ports $S_m$) in the same DMRS CDM group as the first set of DMRS ports (e.g., DMRS CDM group m), and the indexes of a second set of DMRS ports used to transmit DMRSs and interfering data streams 410 to other UEs in a different DMRS CDM group from the first set of DMRS ports. And UE 115-a may categorize the layers associated with the second set of DMRS ports based on the indexes of the first and second sets of DMRS ports and based on the DMRS CDM group that contains each port of the first and second sets of DMRS ports. In particular, UE 115-a may determine that all ports in the second set of DMRS ports in the same CDM group as the first set of DMRS ports with indexes smaller than the indexes of the first set of DMRS ports correspond to NLP layers and that all other ports in the second set of DMRS ports correspond to LP layers. In some examples, a CDM type may be FD-CDM2, CDM4 (FD2-TD2) and CDM8 (FD2-TD4). In some examples, a resource may have multiple CDM groups of the same CDM type, and the ports may be categorized based on different CDM groups (e.g., at least one CSI-RS resource associated with a same CDM group may have a same categorization).

For instance, if UE 115-a receives a DMRS configuration with a value of six (i.e., corresponding to pattern six in Table 1), UE 115-a may determine that the first set of DMRS ports includes DMRS port 3 (e.g., k=3). Thus, UE 115-a may determine that the DMRS port in the second set of DMRS ports in the same CDM group (e.g., DMRS CDM group m) as DMRS port 3 is DMRS port 2 (e.g., $S_m$={2}), and UE 115-a may determine that the DMRS ports in the second set of DMRS ports in a different CDM group from DMRS port 3 are DMRS ports 0 and 1. Accordingly, UE 115-a may determine that the data stream transmitted on DMRS port 2 was encoded using NLP or was transmitted on an NLP layer (e.g., since the index of DMRS port 2 is smaller than the index of DMRS port 3) and data streams transmitted on DMRS ports 0 and 1 were encoded using LP or were transmitted on LP layers (i.e., since all other DMRS ports correspond to LP layers).

In other aspects, in addition to, or as an alternative to, categorizing layers of interfering data streams 410 based on a DMRS configuration received from base station 105-a, UE 115-a may categorize layers of interfering data streams 410 based on an explicit indication of the categorization from base station 105-a.

In one example, base station 105-a may transmit a bitmap to UE 115-a to indicate the categorization of the layers of interfering data streams 410 (i.e., the interference layer categorization). The length of the bitmap may be equal to the number of interference layers, and each bit in the bitmap may indicate whether a corresponding layer is an NLP layer or an LP layer (i.e., whether a corresponding layer includes an interfering data stream 410 encoded using NLP or LP). The order of the bits in the bitmap may correspond to the order of port indexes, where each port may be used to transmit an interfering data stream 410 on a particular layer. In some cases, the bitmap may be transmitted in the same DCI used to transmit the DMRS configuration to UE 115-a, and, in other cases, the bitmap may be transmitted in a separate DCI (e.g., with a separate DCI format).

In another example, base station 105-a may configure a UE 115-a with one or more interference layer categorization tables (e.g., via radio resource control (RRC) and/or MAC control element (MAC-CE) signaling) which may each indicate multiple categorizations of interference layers across multiple rows. And base station 105-a may transmit a row index to UE 115-a for equalizing the received signals to identify the data stream 405, where the row index may indicate the categorization of the layers of interfering data streams 410. In some cases, if UE 115-a is configured with multiple interference layer categorization tables, UE 115-a may determine which table to reference based on a DMRS configuration received from base station 105-a (e.g., based on a total number of ports used for transmitting data stream 405 and interfering data streams 410, the number of layers used to transmit the data stream 405 for UE 115-a, and the number of interference layers used to transmit interfering data streams 410 to other UEs 115).

Once UE 115-a identifies an interference layer categorization table, UE 115-a may identify the categorization of the layers of interfering data streams 410 based on the row index received from base station 105-a. Base station 105-a may transmit the row index in the same DCI used to transmit the DMRS configuration to UE 115-a or in a separate DCI (e.g., with a separate DCI format, which may be a UE-specific DCI format). The order of the columns in the interference layer categorization table may correspond to the order of port indexes, where each port may be used to transmit an interfering data stream 410 on a particular layer. Table 2 is an example of an interference layer categorization table indicating the categorization for up to seven interference layers.

TABLE 2

Interference Layer Categorization Table

|    | 0 | 1 | 2 | 3 | 4 | 5 | 6 |
|----|---|---|---|---|---|---|---|
| 0  | N | N | N | L | L | L | L |
| 1  | L | N | N | L | L | L | L |
| 2  | L | L | N | L | L | L | L |
| 3  | L | L | L | L | L | L | L |
| 4  | L | L | L | L | N | N | N |
| 5  | L | L | L | L | L | N | N |
| 6  | L | L | L | L | L | L | N |
| 7  | N | N | L | N | L | L | L |
| 8  | L | N | L | N | L | L | L |
| 9  | L | L | L | N | L | L | L |
| 10 | L | L | N | L | N | N | L |
| 11 | L | L | L | L | N | N | L |
| 12 | L | L | L | L | L | N | L |

In yet another example, base station 105-a may configure a group of UEs 115 (e.g., including UE 115-a) with multiple interference layer categorization tables in one or more interference layer categorization table sets (e.g., via RRC and/or MAC-CE signaling), where each row of an interference layer categorization table may indicate the interference layer categorization for a specific UE 115 in the group of UEs 115. And base station 105-a may transmit an interference layer categorization table index to UE 115-a for equalizing the received signals to identify the data stream 405, where a predetermined row in the table may indicate the interference layer categorization for UE 115-a.

In some cases, if UE 115-a is configured with multiple interference layer categorization table sets, UE 115-a may determine which table set to reference based on the DMRS configuration received from base station 105-a, and UE 115-a may use the table index received from base station 105-a to identify the particular table to reference in the table set. Base station 105-a may transmit the interference layer categorization table index in the same DCI used to transmit the DMRS configuration to UE 115-a or in a separate DCI (e.g., with a separate DCI format, which may be a UE group common DCI format). The order of the columns in the interference layer categorization table may correspond to the order of port indexes, where each port may be used to transmit an interfering data stream 410 on a particular layer. Further, in each row, the entries may represent whether a corresponding interference layer is an NLP interference layer or an LP interference layer. For instance, in the row with an index of two, the layers with indexes 0, 1, 4, 5, 6, and 7 may be LP layers, and the layer with index 3 may be an NLP layer. The "-" indicated in the table in different rows may correspond to the desired layer for a UE 115. The UE 115 may identify the layer categorization from a row selected based on a port index configured for the UE 115. Tables 3 and 4 are examples of interference layer categorization tables in an interference layer categorization table set indicating the categorization for up to seven interference layers for eight different UEs 115.

TABLE 3

Interference Layer Categorization Table

|   | 0 | 1 | 2 | 3 | 4 | 5 | 6 | 7 |
|---|---|---|---|---|---|---|---|---|
| 0 | — | N | N | N | L | L | L | L |
| 1 | L | — | N | N | L | L | L | L |
| 2 | L | L | — | N | L | L | L | L |
| 3 | L | L | L | — | L | L | L | L |
| 4 | L | L | L | L | — | N | N | N |
| 5 | L | L | L | L | L | — | N | N |
| 6 | L | L | L | L | L | L | — | N |
| 7 | L | L | L | L | L | L | L | — |

TABLE 4

Interference Layer Categorization Table

|   | 0 | 1 | 2 | 3 | 4 | 5 | 6 | 7 |
|---|---|---|---|---|---|---|---|---|
| 0 | — | N | L | L | N | N | L | L |
| 1 | L | — | L | L | N | N | L | L |
| 2 | L | L | — | N | L | L | N | N |
| 3 | L | L | L | — | L | L | N | N |
| 4 | L | L | L | L | — | N | L | L |
| 5 | L | L | L | L | L | — | L | L |
| 6 | L | L | L | L | L | L | — | N |
| 7 | L | L | L | L | L | L | L | — |

By using the techniques described herein, base station 105-a may be able to indicate the categorization of layers to a UE 115-a, and the base station 105-a may therefore have the option to encode data streams on different layers using LP or NLP. In some cases, however, UE 115-a may not be able to equalize signals received from base station 105 that include more than a certain number of NLP layers. In such cases, the UE 115-a may report the maximum number of NLP layers that the UE 115-a can support (i.e., the maximum number of NLP layers than the UE 115-a can process during equalization). Base station 105-a may then perform multi-user scheduling and NLP/LP interference layer configuration based on the maximum number of NLP layers that the UE 115-a can support. For instance, the base station 105-a may identify valid interference layer categorization tables or perform restrictions on the valid configuration in each interference layer categorization table based on the maximum number of NLP layers that the UE 115-*a* can support.

Figure 5:
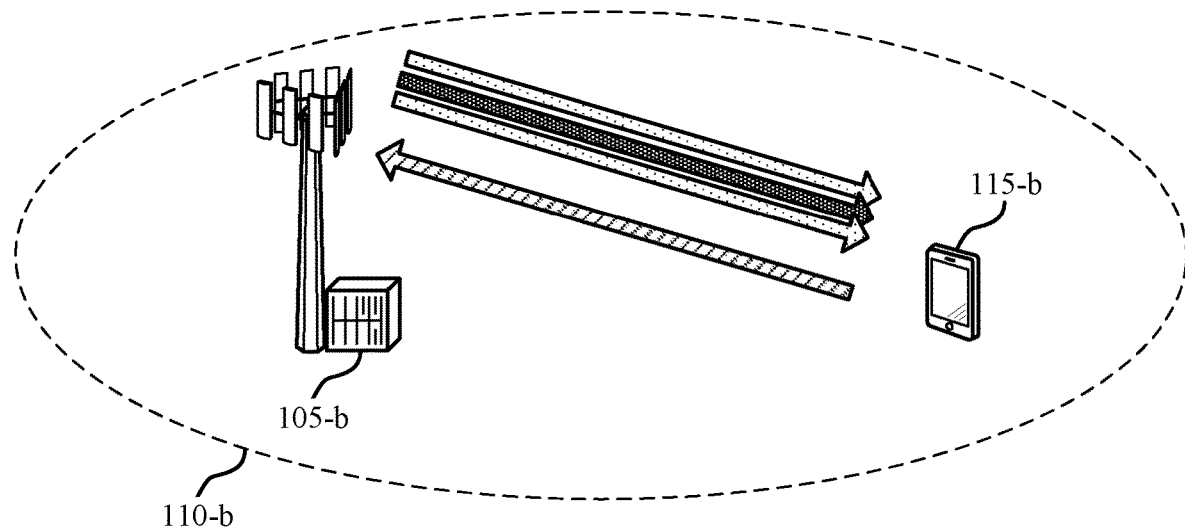

FIG. 5 illustrates an example of a wireless communications system 500 that supports interference layer categorization and NZP IMR for NLP in accordance with aspects of the present disclosure. Wireless communications system 500 includes base station 105-*b*, which may be an example of a base station 105 described with reference to FIGS. 1-3. Wireless communications system 500 also includes UE 115-*b*, which may be an example of a UE 115 described with reference to FIGS. 1-3. Base station 105-*b* may provide communication coverage for a respective coverage area 110-*b*, which may be an example of a coverage area 110 described with reference to FIG. 1. Wireless communications system 500 may implement aspects of wireless communications system 100. For example, wireless communications system 500 may support efficient techniques for configuring UE 115-*b* to categorize interference layers such that UE 115-*b* may be able to equalize and decode CSI-RS transmissions received from base station 105-*b* and report CSI feedback efficiently.

In the example of FIG. 5, base station 105-*b* may transmit multiple CSI report configurations to UE 115-*b*, and base station 105-*b* may use a trigger state (e.g., an NZP CSI-RS trigger state) to trigger one or more CSI reports from UE 115-*b*. A CSI report configuration may include a CSI report quantity, the linked NZP CSI-RS resource set for channel measurement (i.e., CSI-RS resources for channel measurement 505, NZP CMRs 505, or first one or more CSI-RS resources), the CSI for interference measurement (e.g., zero power), and the linked NZP CSI-RS resources for interference measurement (i.e., NZP CSI-RS resources for interference measurement 510, IMRs 510, or second one or more CSI-RS resources). Base station 105-*b* may then generate and transmit CSI-RSs on multiple CSI-RS resources for multiple UEs 115. The CSI-RSs may include CSI-RSs on CMRs 505 and CSI-RSs on IMRs 510. The UE 115-*b* may perform measurements on the CSI-RSs received on the CMRs (e.g., the NZP CMRs) to obtain the channel measurement $h_k^H q_k$. Further, the UE 115-*b* may perform measurements on the CSI-RSs received on IMRs 510 (e.g., NZP IMRs) to obtain the interference measurement $h_k^H q_j$ and inter-cell interference plus noise $R_{nn}$ (e.g., via CSI-IM and/or NZP IMRs). The UE 115-*b* may then use the values of $h_k^H q_k$ and $h_k^H q_j$ to calculate a CSI report.

In some cases, however, though the residual interference nulled out using LP may be equal to the measurement results on the NZP IMR $h_k^H q_j$ (e.g., for UEs k+1 to K), the residual interference due to NLP may not be equal to the measurement results on the NZP IMR $h_k^H q_j$ (e.g., for UEs 1 to k−1). Accordingly, it may be appropriate for UE 115-*b* to perform different calculations for CSI reporting associated with NLP interference layers and CSI reporting associated with purely LP interference layers. The techniques described below allow UE 115-*b* to categorize interference layers such that the UE 115-*b* may be able to perform suitable calculations for CSI reporting. In particular, base station 105-*b* may indicate (e.g., explicitly or implicitly using an indicator) to UE 115-*b* which of the IMRs 510 include CSI-RSs transmitted on an LP layer and which of the IMRs 510 include CSI-RSs transmitted on an NLP layer. In an example, if all interference layers are LP, UE 115-*b* may skip calculating one or more alphas and/or providing feedback on one or more alphas. If there exists at least one NLP interference layer, UE 115-*b* may calculate one or more alphas and/or provide feedback on one or more alphas. Thus, there are different CSI calculations for the case with one or more NLP layers and without NLP layers.

In some aspects, UE 115-*b* may identify the indexes of the CMRs 505 (e.g., CMR index k) and the indexes of IMRs 510 (e.g., based on the CSI report configuration that provides the indexes), and UE 115-*b* may categorize the layers associated with ports used to transmit CSI-RSs on the IMRs 510 based on the indexes of the CMRs 505 and the indexes of the IMRs 510. In particular, UE 115-*b* may determine that all ports used to transmit on IMRs 510 with indexes smaller than the indexes of the CMRs 505 (e.g., S) may be associated with NLP layers and all ports used to transmit on IMRs 510 with indexes larger than the indexes of the CMRs 505 may be associated with LP layers (e.g., based on determining that all ports used to transmit on an IMR 505 are associated with the same layer or same categorization). For instance, if UE 115-*b* identifies that the index of the CMR 505 is 1 (e.g., k=1), UE 115-*b* may determine that the ports used to transmit on an IMR 510 with index 0 are associated with an NLP layer and ports used to transmit on IMRs 510 with indexes 2 and 3 are associated with LP layers. That is, the ports used to transmit on IMR 510 with index 0 may be used to transmit CSI-RSs encoded using NLP and the ports used to transmit on IMRs 510 with indexes 2 and 3 may be used to transmit CSI-RSs encoded using LP.

In other aspects, in addition to, or as an alternative to, categorizing layers of ports used to transmit on IMRs 510 based on a CSI-RS resource configuration received from base station 105-*b*, UE 115-*b* may categorize layers of ports used to transmit on IMRs 510 based on an explicit indication of the categorization from base station 105-*b*.

In one example, base station 105-*b* may transmit a bitmap to UE 115-*b* to indicate the categorization of the ports used to transmit on IMRs 510 (i.e., the interference layer categorization), where the order of the bits in the bitmap follows the order of the indexes of the IMRs 510 or the order of the indexes of the ports used to transmit on IMRs 510. The bitmap may be transmitted in a same DCI used to transmit the CSI-RS resource configuration (i.e., the CSI-RS trigger state) or in a separate DCI (e.g., with a separate DCI format).

In some cases, the length of the bitmap may be equal to the number of IMRs 510, and each bit in the bitmap may indicate whether ports used to transmit CSI-RSs on a corresponding IMR 510 are associated with an NLP layer or an LP layer (e.g., based on the assumption that all ports used to transmit on an IMR 510 are associated with the same layer or same categorization). In other cases, the length of the bitmap may be equal to the number of ports used to transmit on all IMRs 510, and each bit in the bitmap may indicate whether a corresponding port used to transmit CSI-RSs on an IMR 510 is associated with an NLP layer or an LP layer (e.g., based on the assumption that different ports used to transmit on an IMR 510 may be associated with a same layer or a different layer). In yet other cases, the length of the bitmap may be equal to a number of CDM groups of CDM types applied for transmitting CSI-RSs on IMRs 510, and each bit in the bitmap may indicate whether ports in a corresponding CDM group are associated with an NLP layer or an LP layer.

In another example, base station 105-*b* may configure a UE 115-*b* with one or more interference layer categorization tables (e.g., via RRC or MAC-CE signaling) which may each indicate multiple categorizations of IMRs across multiple rows, and base station 105-*b* may transmit a row index to UE 115-*b*, where the row index may indicate the specific categorization of IMRs across a particular row. In some cases, if UE 115-*b* is configured with multiple interference layer categorization tables, UE 115-*b* may determine which table to reference based on a CSI-RS configuration received from base station 105-*b* (e.g., based on a total number of IMRs 510).

Once UE 115-*b* identifies an interference layer categorization table, UE 115-*b* may identify the categorization of the IMRs based on the row index received from base station 105-*b*. Base station 105-*b* may transmit the row index in the same DCI used to transmit the CSI-RS configuration to UE 115-*b* or in a separate DCI (e.g., with a separate DCI format, which may be a UE-specific DCI format). The order of the columns in the interference layer categorization table may correspond to the order of IMR indexes, where each port used to transmit on an IMR 510 may be associated with a same layer or categorization. Table 2 is an example of an interference layer categorization table indicating the categorization for up to seven IMRs.

In yet another example, base station 105-*b* may configure a group of UEs 115 (e.g., including UE 115-*b*) with multiple interference layer categorization tables in one or more interference layer categorization table sets (e.g., via RRC and/or MAC-CE signaling), where each row of an interference layer categorization table may indicate the interference layer categorization for a specific UE 115 in the group of UEs 115. And base station 105-*b* may transmit an interference layer categorization table index to UE 115-*b*, where a predetermined row in a table corresponding to the table index may indicate the interference layer categorization for UE 115-*b*.

In some cases, if UE 115-*b* is configured with multiple interference layer categorization table sets, UE 115-*b* may determine which table set to reference based on the CSI-RS configuration received from base station 105-*b*, and UE 115-*b* may use the table index received from base station 105-*b* to identify the particular table to reference in the table set. Base station 105-*b* may transmit the interference layer categorization table index in the same DCI used to transmit the CSI-RS configuration to UE 115-*b* or in a separate DCI (e.g., with a separate DCI format, which may be a UE group common DCI format). The order of the columns in the interference layer categorization table may correspond to the order of IMR indexes, where each port used to transmit on an IMR 510 may be associated with a same layer or categorization. Tables 3 and 4 are examples of interference layer categorization tables in an interference layer categorization table set indicating the categorization for up to seven IMRs for eight different UEs 115.

In yet another example, base station 105-*b* may determine that all ports used to transmit on IMRs 510 are associated with an NLP layer, and base station 105-*b* may transmit a one-bit indication indicating that all ports used to transmit on IMRs 510 are associated with an NLP layer. Base station 105-*b* may transmit the one-bit indication in the same DCI used to transmit the CSI-RS configuration to UE 115-*b* or in a separate DCI (e.g., with a separate DCI format).

By using the techniques described herein, base station 105-*b* may be able to indicate the categorization of IMRs to a UE 115-*b*, and the UE 115-*a* may be able to calculate feedback for a CSI report associated with an NLP layer. In some cases, however, UE 115-*b* may not be able to equalize signals received from base station 105 that include more than a certain number of NLP layers. In such cases, it may not be appropriate for UE 115-*a* to report feedback for more NLP layers than the maximum number of NLP layers that UE 115-*a* can support. Accordingly, the UE 115-*b* may report the maximum number of NLP layers that the UE 115-*b* can support (i.e., the maximum number of NLP layers than the UE 115-*b* can process during equalization). Base station 105-*b* may then perform multi-user scheduling and NLP/LP interference layer configuration based on the maximum number of NLP layers that the UE 115-*b* can support. For instance, the base station 105-*b* may identify valid interference layer categorization tables or perform restrictions on the valid configuration in each interference layer categorization table based on the maximum number of NLP layers that the UE 115-*b* can support.

After UE 115-*b* is able to identify the categorization of IMRs based on any of the indications described above from base station 105-*b*, UE 115-*b* may perform calculations for CSI reporting based on the categorization for IMRs. Specifically, for NLP layers, UE 115-*b* may calculate the values of a number of NLP perturbation factors (i.e., $\alpha_{kj}$) to report to base station 105-*b*. The values of $\alpha_{kj}$ or the NLP perturbation factors may represent the interference caused by each NLP IMR on the CSI-RSs on CMR 505. In some cases, it may be appropriate for UE 115-*b* to report the NLP perturbation parameters to base station 105-*b* (e.g., one NLP perturbation parameter per NLP IMR) such that the base station 105-*b* may be able to use these values for precoding downlink transmissions to UE 115-*b*.

In an example, UE 115-*b* may calculate the NLP perturbation parameter for the j-th NLP IMR based on the following equation:

$$\alpha_{kj} = Q_k^H H_k^H \cdot (H_k Q_k Q_k^H H_k^H + R_{nn})^{-1} \cdot H_k Q_j \tag{2}$$

where $Q_k^H H_k^H$ may be measured from NZP CMR 505, $R_{nn}$ may be measured from LP NZP IMR 510 and CSI-IM, $H_k Q_j$ may be measured from the j-th NLP NZP IMR 510, and the dimension of $\alpha_{kj}$ is given by the number of ports used to transmit on CMR 505 and the number of ports used to transmit on the j-th IMR 510. Once UE 115-*b* calculates the NLP perturbation parameters for the IMRs 510, UE 115-*b* may transmit the NLP perturbation parameters in CSI report 515 along with CSI-RS channel measurements.

In some cases, UE 115-*b* may report an NLP perturbation parameter based on an element-wise quantization of the parameter. For instance, UE 115-*b* may report the amplitude and phase of each element in the vector $\alpha_{kj}$ for a particular IMR 510, where each element in the vector corresponds to a respective port used to transmit on the IMR 510. In other cases, UE 115-*b* may report an NLP perturbation parameter based on a principal component approximation (PCA) quantization of the parameter. For instance, UE 115-*b* may report the linear combination of a base indices feedback for wideband (i.e., $b_l$) and coefficients (i.e., $\varphi_l$) including the amplitude and phase of the perturbation parameter corresponding to wideband or sub-band.

$$\alpha_{kj} = \sum_{l=1}^{L} b_l \times \varphi_l \tag{3}$$

For wideband feedback of the coefficients, UE 115-*b* may report an amplitude and phase of the perturbation parameter corresponding to the wideband (e.g., a defined bandwidth). And for sub-band feedback of the coefficients, UE 115-*b* may report a first value corresponding to the wideband (e.g., a defined bandwidth) and a second value corresponding to a portion of the wideband (e.g., a portion of the defined bandwidth) based on the first value. The second value may provide differential feedback per sub-band (e.g., one or more resource blocks) relative to the first value for wideband feedback.

Figure 6:
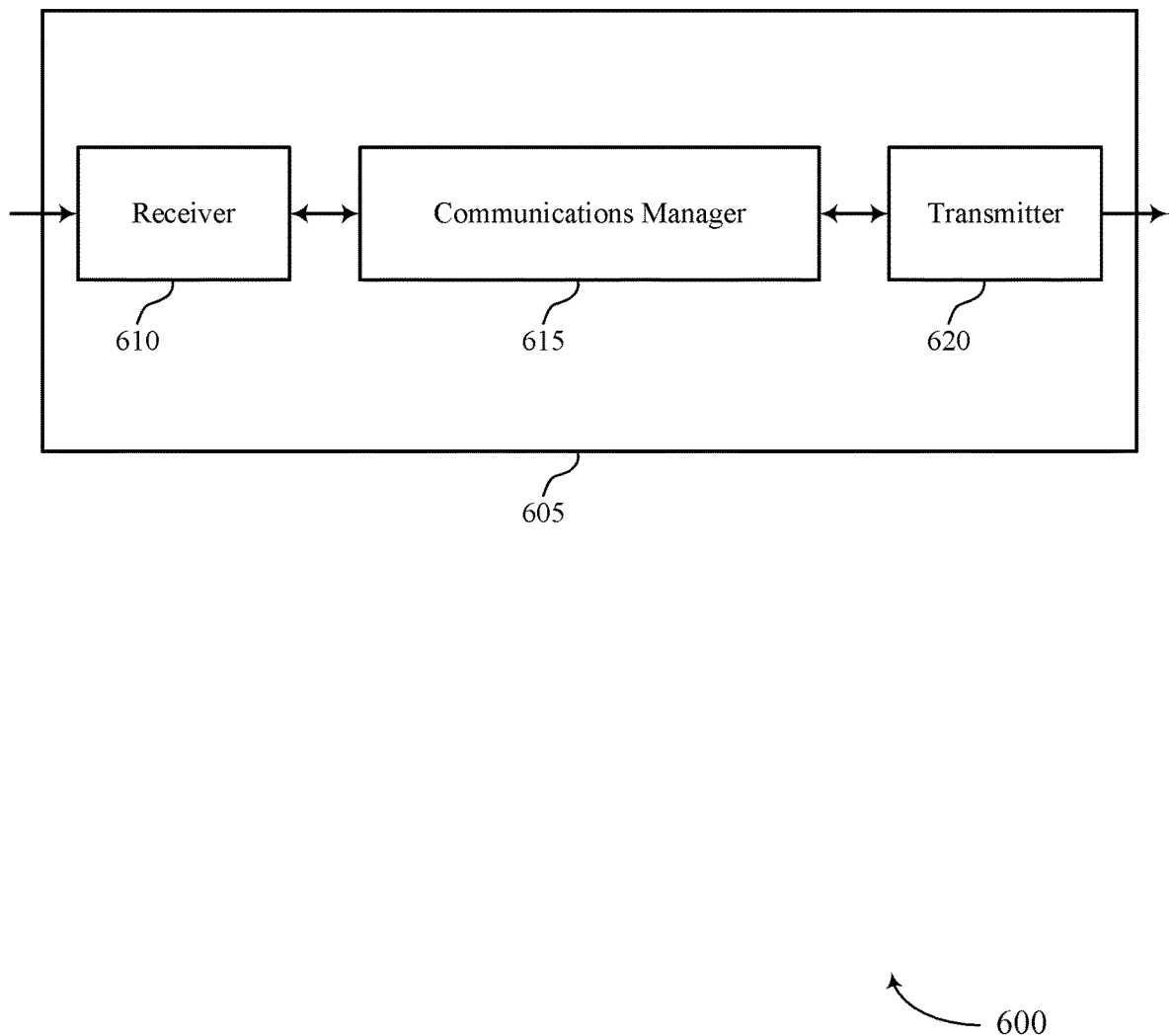
FIGS. 6 and 7 show block diagrams of devices that support interference layer categorization and NZP IMR for NLP in accordance with aspects of the present disclosure.

FIG. 6 shows a block diagram 600 of a device 605 that supports interference layer categorization and NZP IMR for NLP in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to interference layer categorization and NZP IMR for NLP, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a configuration of a first one or more reference signal ports associated with at least one data stream for the UE, identify a second one or more reference signal ports unassociated with the at least one data stream for the UE, receive an indicator indicating a categorization of each of the second one or more reference signal ports as corresponding to one of a first type of layer or a second type of layer, receive a transmission associated with the first one or more reference signal ports, and decode the transmission to obtain the at least one data stream based on the categorization of the second one or more reference signal ports.

The communications manager 615 may also receive a configuration of a first one or more CSI-RS resources for channel measurement and a configuration of a second one or more CSI-RS resources for interference measurement, transmit a CSI report based on the configuration of the first one or more CSI-RS resources, the configuration of the second one or more CSI-RS resources, and the categorization, and receive an indicator indicating a categorization of each port used to transmit on the second one or more CSI-RS resources for interference measurement as corresponding to one of a first type of layer or a second type of layer. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
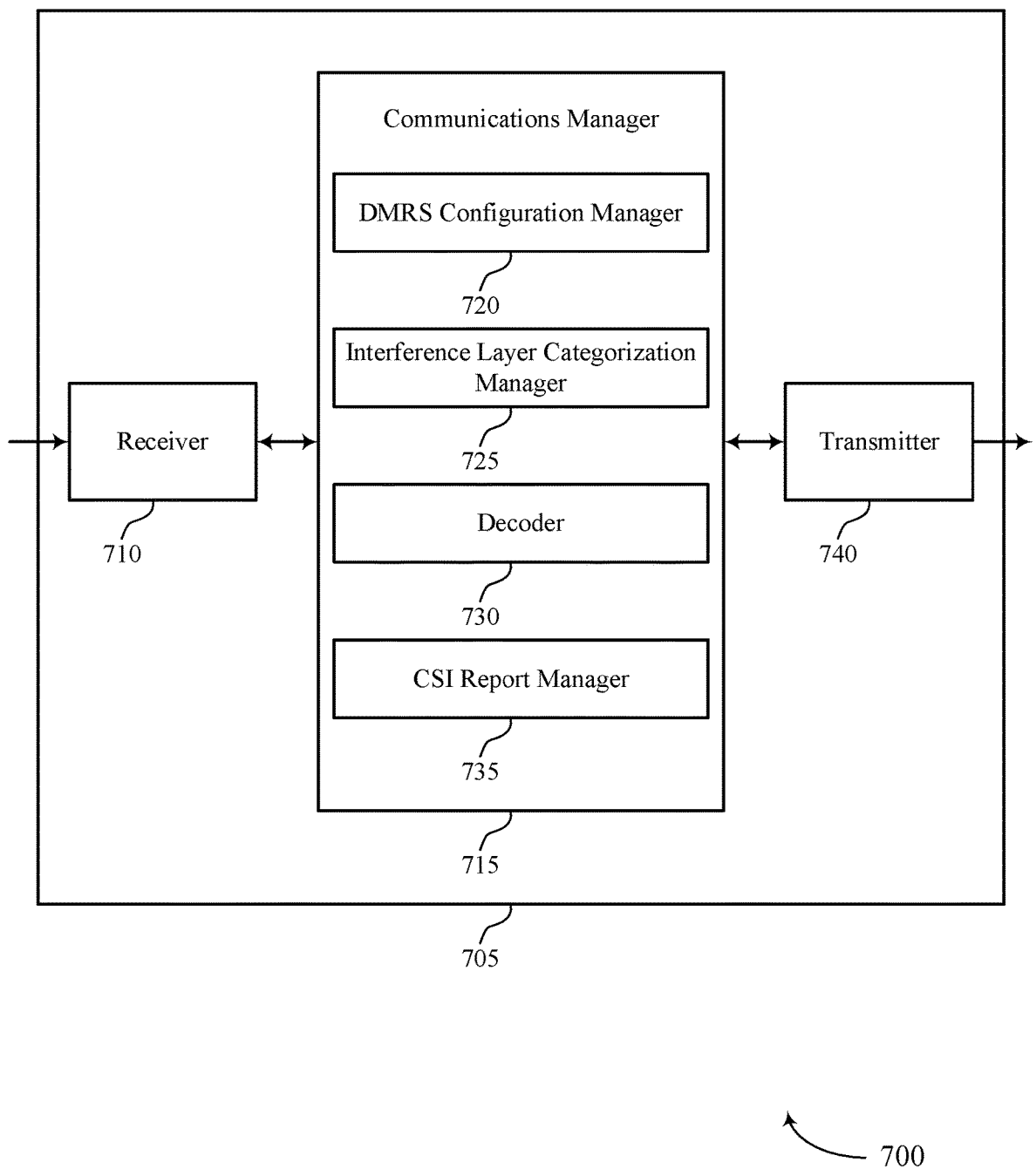

FIG. 7 shows a block diagram 700 of a device 705 that supports interference layer categorization and NZP IMR for NLP in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to interference layer categorization and NZP IMR for NLP, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a DMRS configuration manager 720, an interference layer categorization manager 725, a decoder 730, and a CSI report manager 735. The communications manager 715 may be an example of aspects of the communications manager 910 described herein.

The DMRS configuration manager 720 may receive a configuration of a first one or more reference signal ports associated with at least one data stream for the UE and identify a second one or more reference signal ports unassociated with the at least one data stream for the UE. The interference layer categorization manager 725 may receive an indicator indicating a categorization of each of the second one or more reference signal ports as corresponding to one of a first type of layer or a second type of layer. The decoder 730 may receive a transmission associated with the first one or more reference signal ports and decode the transmission to obtain the at least one data stream based on the categorization of the second one or more reference signal ports.

The CSI report manager 735 may receive a configuration of a first one or more CSI-RS resources for channel measurement and a configuration of a second one or more CSI-RS resources for interference measurement. The interference layer categorization manager 725 may receive an indicator indicating a categorization of each port used to transmit on the second one or more CSI-RS resources for interference measurement as corresponding to one of a first type of layer or a second type of layer. The CSI report manager 735 may then transmit a CSI report based on the configuration of the first one or more CSI-RS resources, the configuration of the second one or more CSI-RS resources, and the categorization.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
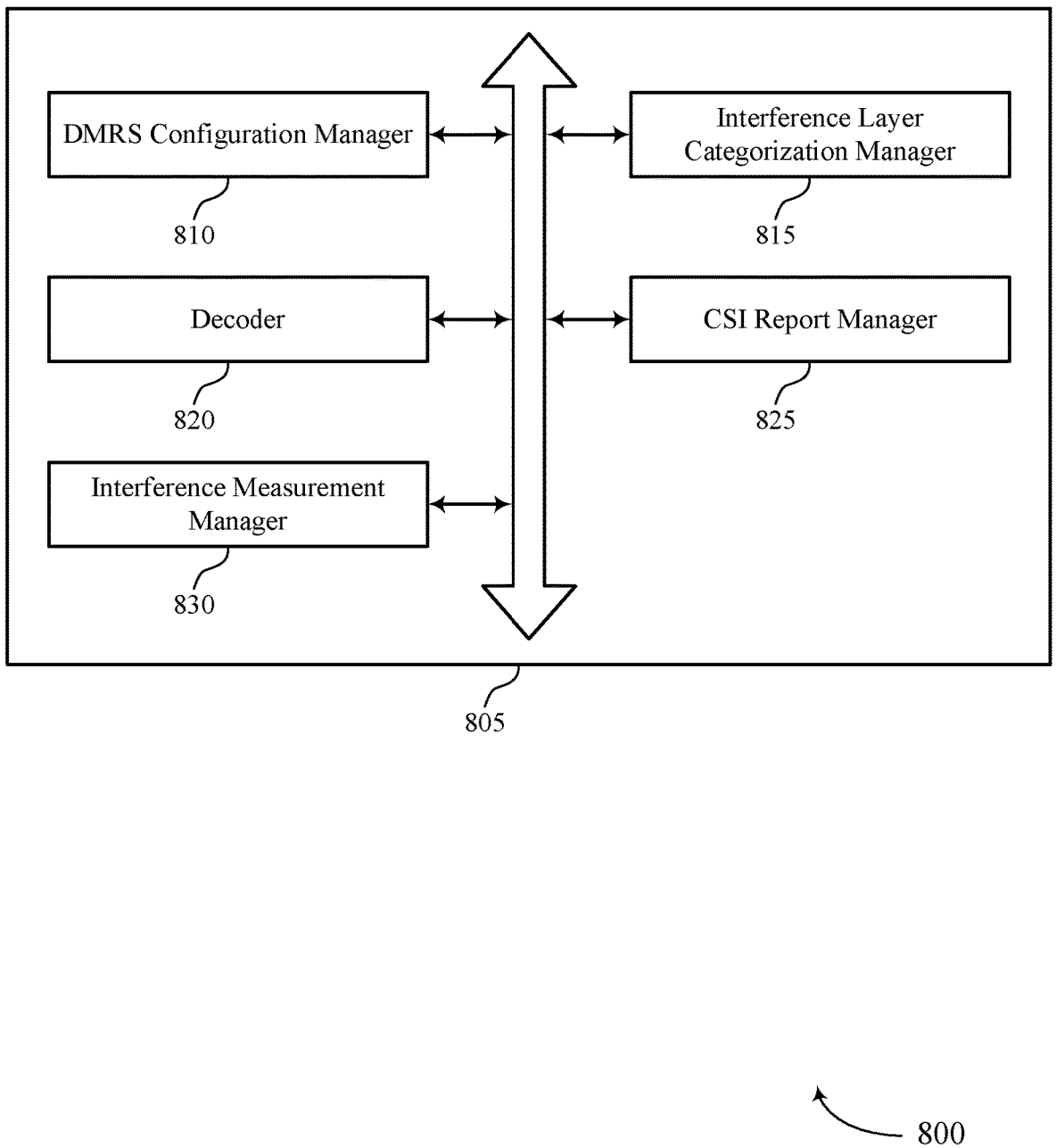
FIG. 8 shows a block diagram of a communications manager that supports interference layer categorization and NZP IMR for NLP in accordance with aspects of the present disclosure.

FIG. 8 shows a block diagram 800 of a communications manager 805 that supports interference layer categorization and NZP IMR for NLP in accordance with aspects of the present disclosure. The communications manager 805 may be an example of aspects of a communications manager 615, a communications manager 715, or a communications manager 910 described herein. The communications manager 805 may include a DMRS configuration manager 810, an interference layer categorization manager 815, a decoder 820, a CSI report manager 825, and an interference measurement manager 830. Each of these modules may communicate, directly or indirectly, with one another (e.g., via one or more buses).

The DMRS configuration manager 810 may receive a configuration of a first one or more reference signal ports associated with at least one data stream for the UE. In some examples, the DMRS configuration manager 810 may identify a second one or more reference signal ports unassociated with the at least one data stream for the UE. The interference layer categorization manager 815 may receive an indicator indicating a categorization of each of the second one or more reference signal ports as corresponding to one of a first type of layer or a second type of layer. In some examples, the interference layer categorization manager 815 may receive an indicator indicating a categorization of each port used to transmit on the second one or more CSI-RS resources for interference measurement as corresponding to one of a first type of layer or a second type of layer. For instance, the interference layer categorization manager 815 may receive the indicator in an RRC message, a MAC-CE, or a DCI message (e.g., the bitmap, row index, etc. may be configured via the RRC message, MAC-CE, or DCI message).

In some examples, the interference layer categorization manager 815 may identify the categorization of each of the second one or more reference signal ports based on the one or more reference signal indexes of the first one or more reference signal ports. In some examples, the interference layer categorization manager 815 may determine the categorization of each port of the second one or more reference signal ports based on a comparison of an index of a respective port of the second one or more reference signal ports with the one or more reference signal indexes. In some examples, the interference layer categorization manager 815 may identify the categorization of each of the second one or more reference signal ports based on the one or more reference signal indexes and the one or more group indexes.

In some examples, the interference layer categorization manager 815 may identify the first one or more reference signal ports based on the one or more reference signal indexes and one or more configured groups of a set of groups based on the one or more group indexes. In some examples, the interference layer categorization manager 815 may categorize, within the one or more configured groups, each port of the second one or more reference signal ports as corresponding to the first type of layer. In some examples, the interference layer categorization manager 815 may categorize, within each unconfigured group of the set of groups, each port of the second one or more reference signal ports as corresponding to the second type of layer.

In some examples, the interference layer categorization manager 815 may identify the categorization of each of the second one or more reference signal ports based on a respective bit within the bitmap. In some examples, the interference layer categorization manager 815 may identify a first configuration table. In some examples, the interference layer categorization manager 815 may categorize each of the second one or more reference signal ports as corresponding to one of the first type of layer or the second type of layer by indexing the first configuration table based on the row index. In some examples, the interference layer categorization manager 815 may receive an indication of the first configuration table. In some examples, the interference layer categorization manager 815 may receive the indication of the first configuration table in a RRC message, a MAC-CE, or a DCI message.

In some examples, the interference layer categorization manager 815 may identify the first configuration table from a set of configuration tables based on a defined number of the first one or more reference signal ports, a defined number of layers associated with the first one or more reference signal ports, a defined number of layers associated with the second one or more reference signal ports, a defined number of the second one or more reference signal ports, or any combination thereof. In some examples, the interference layer categorization manager 815 may identify indexes of the first one or more reference signal ports based on the indicator. In some examples, the interference layer categorization manager 815 may identify a first configuration table of a set of configuration tables.

In some examples, the interference layer categorization manager 815 may categorize each of the second one or more reference signal ports as corresponding to one of the first type of layer or the second type of layer by indexing the first configuration table based on the identified indexes of the first one or more reference signal ports. In some examples, the interference layer categorization manager 815 may identify the categorization of each port used to transmit on the second one or more CSI-RS resources based on the one or more indexes of the first one or more CSI-RS resources. In some examples, the interference layer categorization manager 815 may determine that all ports used to transmit on a same resource of the second one or more CSI-RS resources have a same categorization.

In some examples, the interference layer categorization manager 815 may determine the categorization of each port used to transmit on each CSI-RS resource of the second one or more CSI-RS resources based on a comparison of an index of a respective CSI-RS resource with the one or more indexes of the first one or more CSI-RS resources. In some examples, the interference layer categorization manager 815 may identify the categorization of each port used to transmit on each CSI-RS resource of the second one or more CSI-RS resources based on the bitmap, where a number of bits in the bitmap is equal to a number of resources of the second one or more CSI-RS resources. In some examples, the interference layer categorization manager 815 may identify the categorization of each port used to transmit on each CSI-RS resource of the second one or more CSI-RS resources based on the bitmap, where the number of bits in the bitmap is equal to a number of ports used to transmit on all of the second one or more CSI-RS resources.

In some examples, the interference layer categorization manager 815 may identify a CDM type applied for transmission on each resource of the second one or more CSI-RS resources. In some examples, the interference layer categorization manager 815 may determine that all ports used to transmit on a resource of the second one or more CSI-RS resources associated with a same CDM group have a same categorization. In some examples, the interference layer categorization manager 815 may determine the categorization based on a bitmap, where a number of bits in the bitmap is equal to a number of CDM groups applied for transmission on all of the second one or more CSI-RS resources. In some examples, the interference layer categorization manager 815 may identify a first configuration table of a set of configuration tables.

In some examples, the interference layer categorization manager 815 may categorize each port used to transmit on each of the second one or more CSI-RS resources as corresponding to one of the first type of layer or the second type of layer by indexing the first configuration table based on the row index. In some examples, the interference layer categorization manager 815 may identify the first configuration table is based on a number of the second one or more CSI-RS resources. In some examples, the interference layer categorization manager 815 may identify indexes of the first one or more CSI-RS resources based on the indicator. In some examples, the interference layer categorization manager 815 may categorize each port used to transmit on each of the second one or more CSI-RS resources as corresponding to one of the first type of layer or the second type of layer by indexing the first configuration table based on the identified indexes of the first one or more CSI-RS resources.

In some examples, the interference layer categorization manager 815 may receive at least one of a RRC message, a medium access control (MAC) control element (MAC-CE), or a DCI message indicating that each port used to transmit each of the second one or more CSI-RS resources corresponds to the first type of layer or the second type of layer. In some cases, a number of bits in the bitmap corresponds to a number of the second one or more reference signal ports. In some cases, the first configuration table includes a single configuration table accessible by the UE. In some cases, the first type of layer or the second type of layer is a non-linear precoding layer. In some cases, the first type of layer or the second type of layer is a linear precoding layer.

The decoder 820 may receive a transmission associated with the first one or more reference signal ports. In some examples, the decoder 820 may decode the transmission to obtain the at least one data stream based on the categorization of the second one or more reference signal ports. In some examples, the decoder 820 may transmit a support indicator that indicates a defined number of the second one or more ports associated with the first type of layer, the second type of layer, or both, capable of being supported by the UE or a defined number of a second one or more layers of the first type, the second type, or both, capable of being supported by the UE. In some examples, the decoder 820 may transmit a support indicator that indicates a defined number of the first one or more ports associated with the first type of layer, the second type of layer, or both, capable of being supported by the UE or a defined number of a first one or more layers of the first type, the second type, or both, capable of being supported by the UE.

In some examples, the decoder 820 may determine a parameter corresponding to a first port of the second one or more reference signal ports corresponding to the first type of layer. In some examples, the decoder 820 may decode the at least one data stream based on the parameter. In some examples, the decoder 820 may transmit a support indicator that indicates a defined number of ports associated with the first type of layer in the second one or more CSI-RS resources, the second type of layer in the second one or more CSI-RS resources, or both, capable of being supported by the UE.

The CSI report manager 825 may receive a configuration of a first one or more CSI-RS resources for channel measurement and a configuration of a second one or more CSI-RS resources for interference measurement. In some examples, the CSI report manager 825 may transmit a CSI report based on the configuration of the first one or more CSI-RS resources, the configuration of the second one or more CSI-RS resources, and the categorization. In some cases, the report indicates CSI determined based on the channel measurement, one or more of the interference measurements, or both. In some cases, each of the first one or more CSI-RS resources and the second one or more CSI-RS resources is a non-zero power reference signal resource.

The interference measurement manager 835 may determine one or more parameters based on the first one or more CSI-RS resources, the second one or more CSI-RS resources, and the categorization, where the CSI report includes the one or more parameters. In some examples, the interference measurement manager 835 may generate the channel measurement based on measuring the first one or more CSI-RS resources. In some examples, the interference measurement manager 835 may generate a first interference measurement based on measuring the second one or more CSI-RS resources categorized as corresponding to the first type of layer. In some examples, the interference measurement manager 835 may generate a second interference measurement based on measuring the second one or more CSI-RS resources categorized as corresponding to the second type of layer.

In some examples, the interference measurement manager 835 may determine the one or more parameters based on the channel measurement, the first interference measurement, and the second interference measurement. In some examples, reporting a parameter of the one or more parameters includes reporting an amplitude and phase of the parameter. In some examples, reporting the amplitude and phase of a parameter of the one or more parameters includes reporting the amplitude and phase of the parameter of the one or more parameters corresponding to a defined bandwidth.

In some examples, reporting the amplitude and phase of a parameter of the one or more parameters includes reporting a first value corresponding to a defined bandwidth and a second value corresponding to a portion of the defined bandwidth, where the second value includes an offset relative to the first value. In some cases, the CSI report includes at least a CQI and the CQI is computed based on the one or more parameters. In some cases, each of the one or more parameters indicates a measurement of interference from an interference layer corresponding to a port of the second one or more CSI-RS resources on a port of the first one or more CSI-RS resources.

Figure 9:
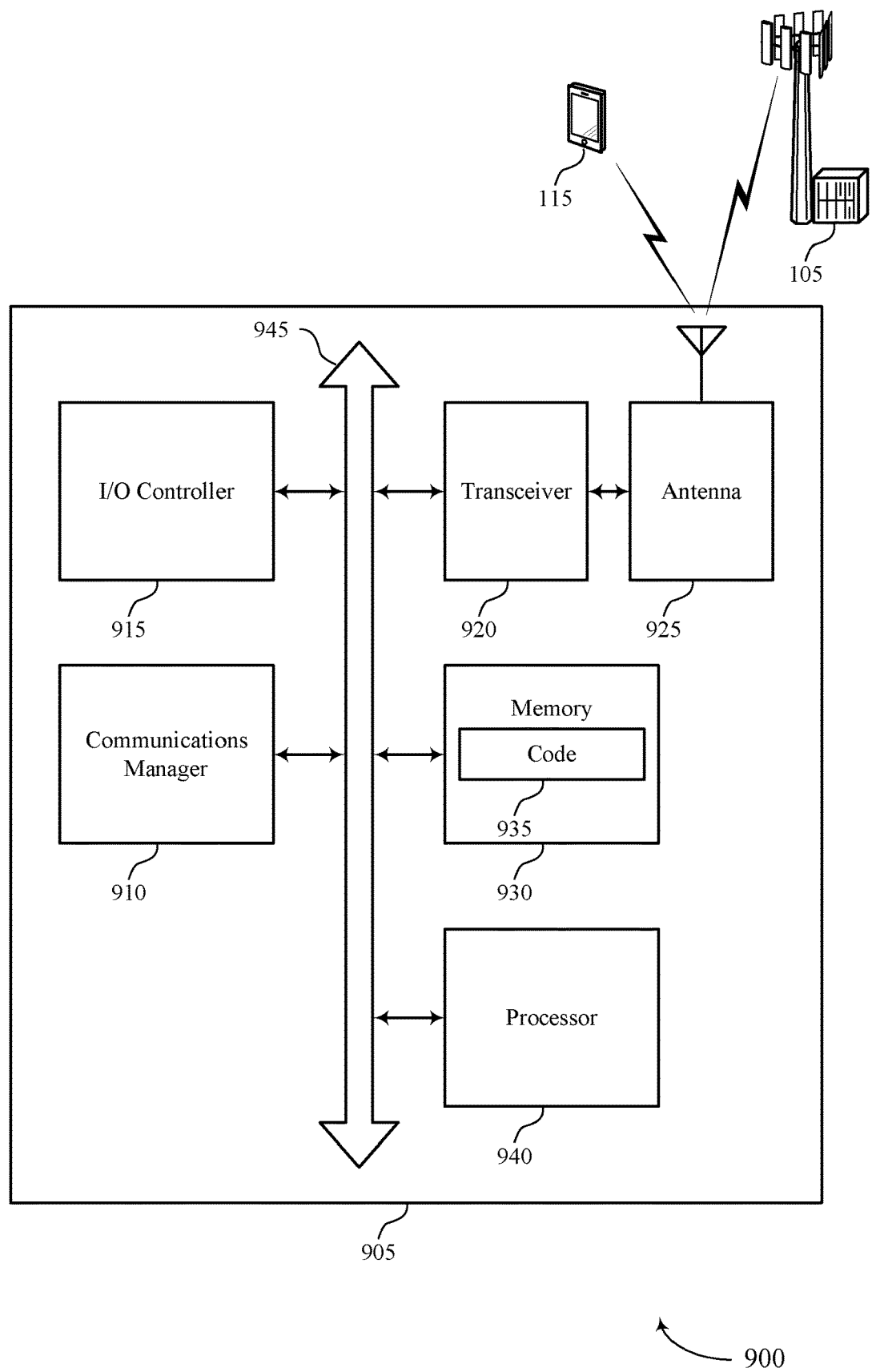
FIG. 9 shows a diagram of a system including a device that supports interference layer categorization and NZP IMR for NLP in accordance with aspects of the present disclosure.

FIG. 9 shows a diagram of a system 900 including a device 905 that supports interference layer categorization and NZP IMR for NLP in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a configuration of a first one or more reference signal ports associated with at least one data stream for the UE, identify a second one or more reference signal ports unassociated with the at least one data stream for the UE, receive an indicator indicating a categorization of each of the second one or more reference signal ports as corresponding to one of a first type of layer or a second type of layer, receive a transmission associated with the first one or more reference signal ports, and decode the transmission to obtain the at least one data stream based on the categorization of the second one or more reference signal ports.

The communications manager 910 may also receive a configuration of a first one or more CSI-RS resources for channel measurement and a configuration of a second one or more CSI-RS resources for interference measurement, transmit a CSI report based on the configuration of the first one or more CSI-RS resources, the configuration of the second one or more CSI-RS resources, and the categorization, and receive an indicator indicating a categorization of each port used to transmit on the second one or more CSI-RS resources for interference measurement as corresponding to one of a first type of layer or a second type of layer.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting interference layer categorization and NZP IMR for NLP).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
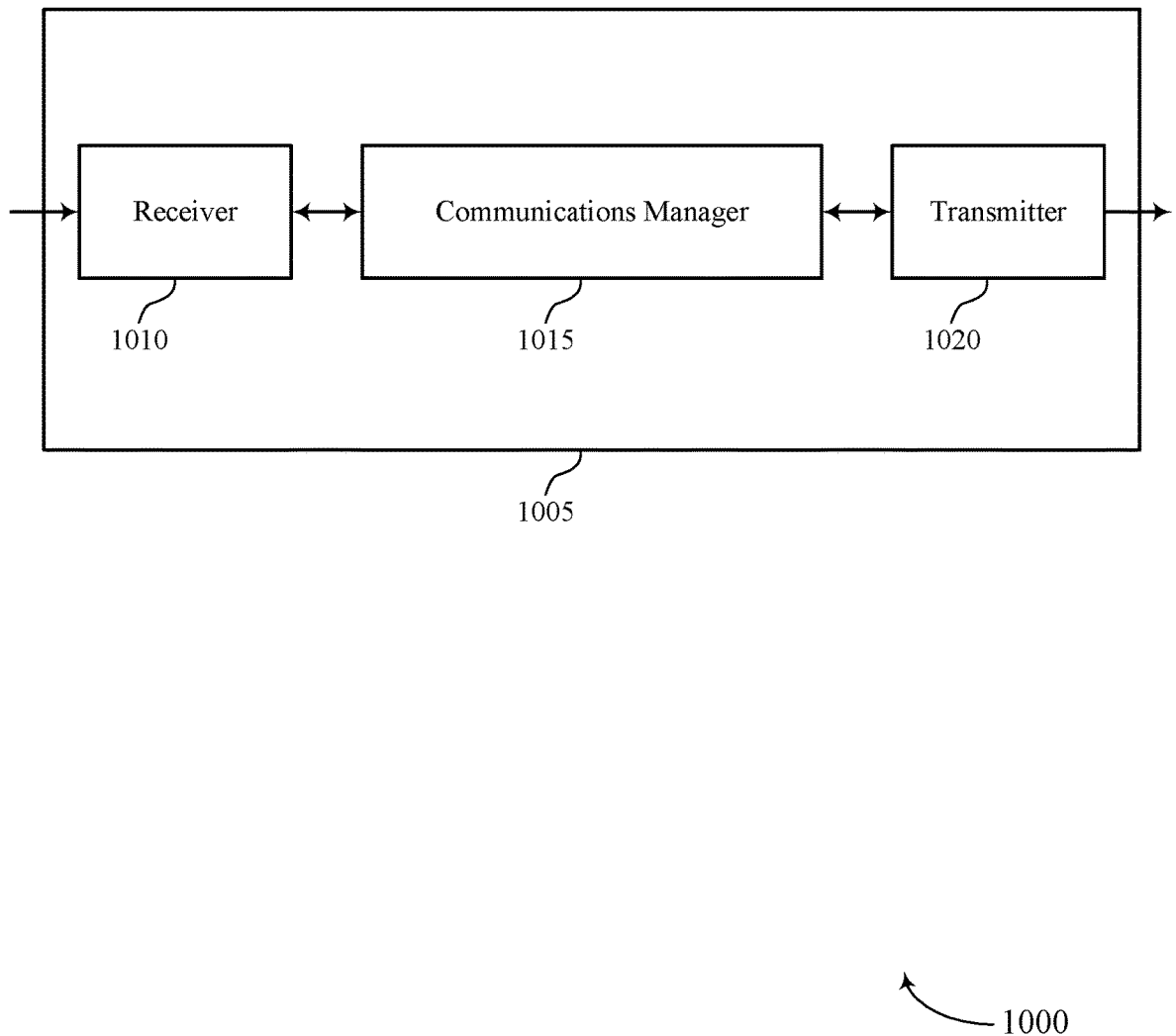
FIGS. 10 and 11 show block diagrams of devices that support interference layer categorization and NZP IMR for NLP in accordance with aspects of the present disclosure.

FIG. 10 shows a block diagram 1000 of a device 1005 that supports interference layer categorization and NZP IMR for NLP in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to interference layer categorization and NZP IMR for NLP, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a configuration of a first one or more reference signal ports associated with at least one data stream for a UE, the first one or more reference signal ports being different from a second one or more reference signal ports unassociated with the at least one data stream for the UE, transmit an indicator indicating a categorization of each of the second one or more reference signal ports as corresponding to one of a first type of layer or a second type of layer, and transmit the at least one data stream using the first one or more reference signal ports.

The communications manager 1015 may also transmit a configuration of a first one or more CSI-RS resources for channel measurement and a configuration of a second one or more CSI-RS resources for interference measurement, receive a report based on the categorization, transmit an indicator indicating a categorization of each port used to transmit on the second one or more CSI-RS resources for interference measurement as corresponding to one of a first type of interference layer or a second type of interference layer, and transmit CSI-RSs in each of the first one or more CSI-RS resources and the second one or more CSI-RS resources in accordance with the indicator. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
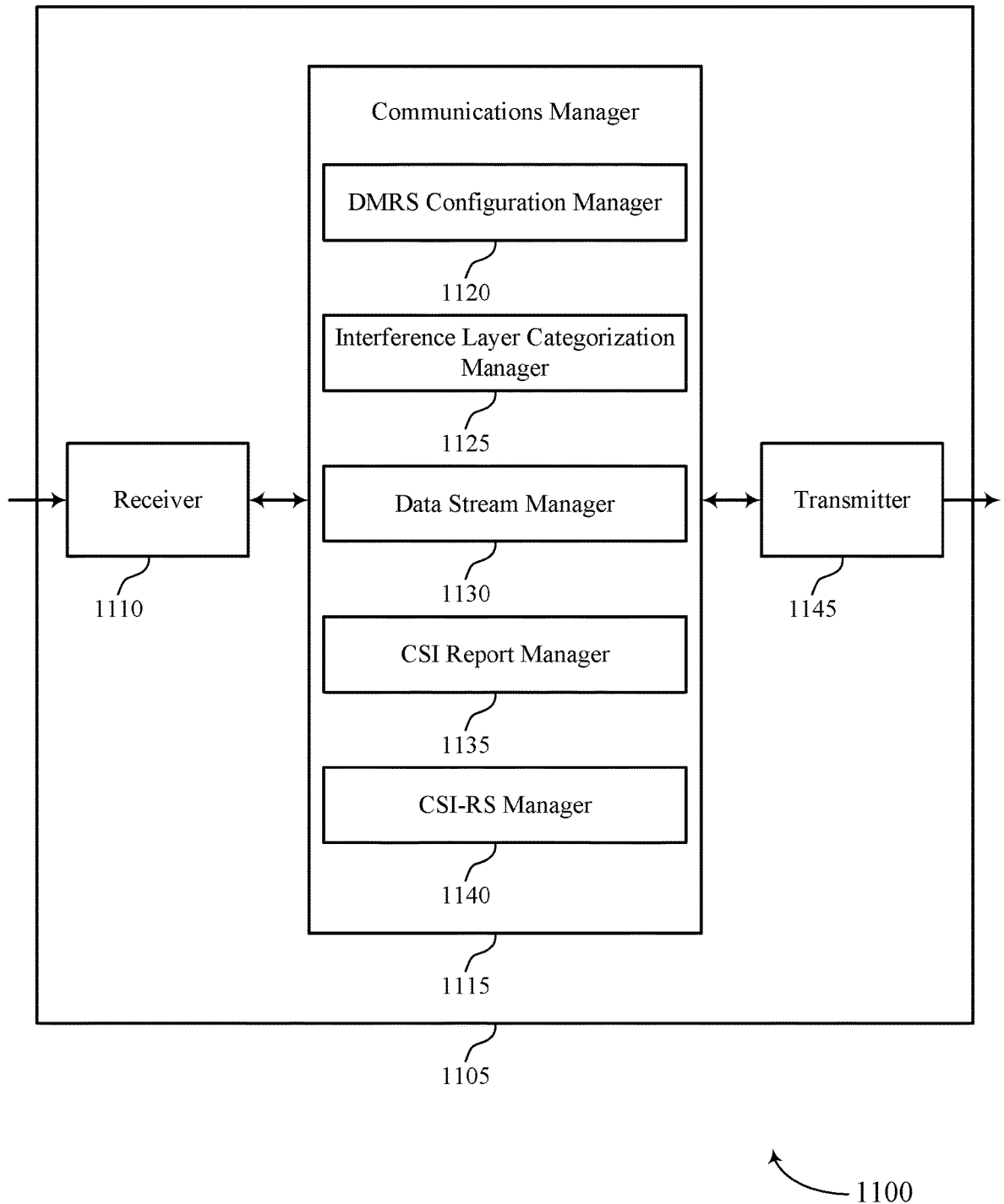

FIG. 11 shows a block diagram 1100 of a device 1105 that supports interference layer categorization and NZP IMR for NLP in accordance with aspects of the present disclosure. The device 1105 may be an example of aspects of a device 1005, or a base station 105 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to interference layer categorization and NZP IMR for NLP, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a DMRS configuration manager 1120, an interference layer categorization manager 1125, a data stream manager 1130, a CSI report manager 1135, and a CSI-RS manager 1140. The communications manager 1115 may be an example of aspects of the communications manager 1310 described herein.

The DMRS configuration manager 1120 may transmit a configuration of a first one or more reference signal ports associated with at least one data stream for a UE, the first one or more reference signal ports being different from a second one or more reference signal ports unassociated with the at least one data stream for the UE. The interference layer categorization manager 1125 may transmit an indicator indicating a categorization of each of the second one or more reference signal ports as corresponding to one of a first type of layer or a second type of layer. The data stream manager 1130 may transmit the at least one data stream using the first one or more reference signal ports.

The CSI report manager 1135 may transmit a configuration of a first one or more CSI-RS resources for channel measurement and a configuration of a second one or more CSI-RS resources for interference measurement. The interference layer categorization manager 1125 may transmit an indicator indicating a categorization of each port used to transmit on the second one or more CSI-RS resources for interference measurement as corresponding to one of a first type of interference layer or a second type of interference layer. The CSI-RS manager 1140 may transmit CSI-RSs in each of the first one or more CSI-RS resources and the second one or more CSI-RS resources in accordance with the indicator. The CSI report manager 1135 may then receive a report based on the categorization.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
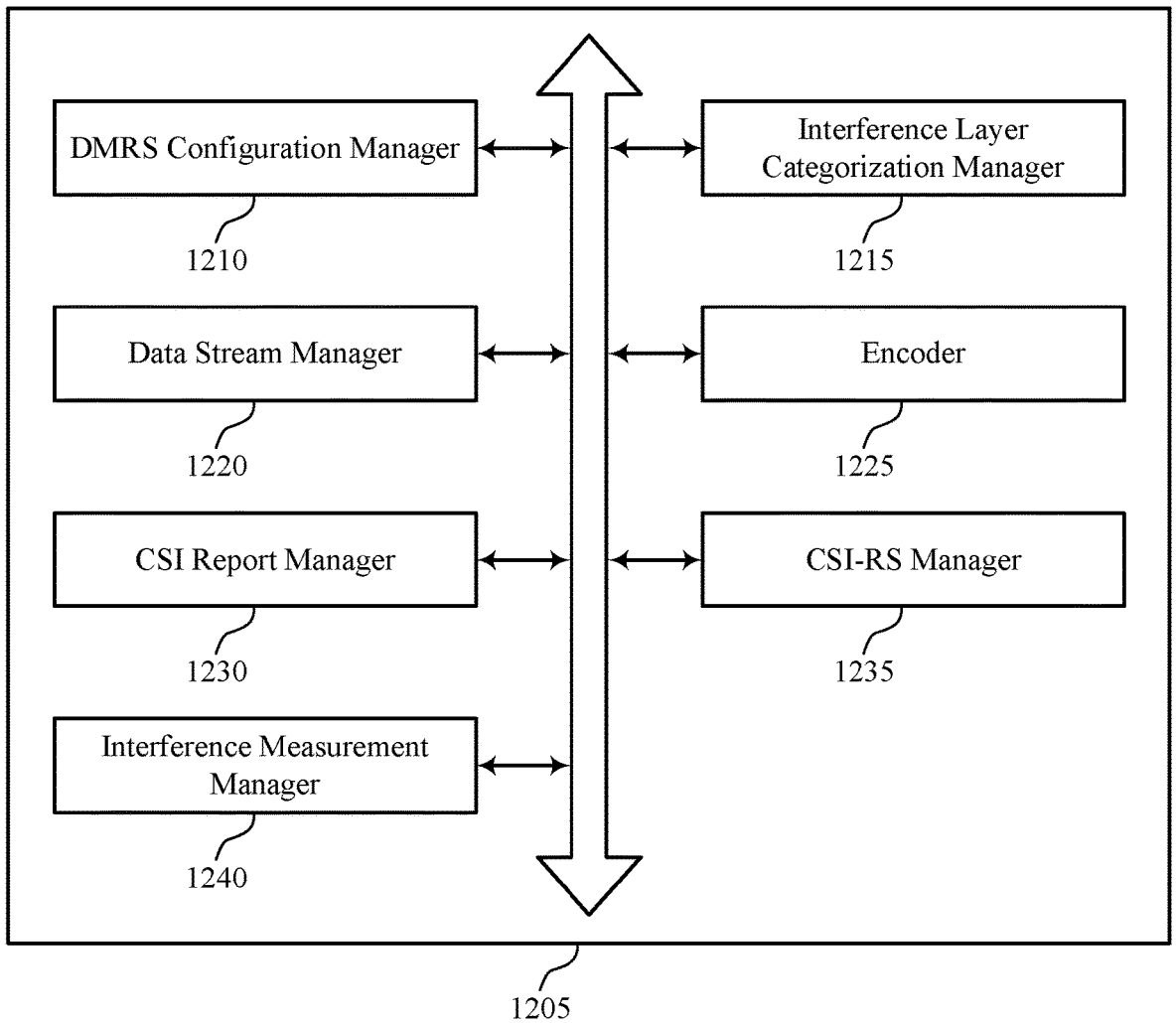
FIG. 12 shows a block diagram of a communications manager that supports interference layer categorization and NZP IMR for NLP in accordance with aspects of the present disclosure.

FIG. 12 shows a block diagram 1200 of a communications manager 1205 that supports interference layer categorization and NZP IMR for NLP in accordance with aspects of the present disclosure. The communications manager 1205 may be an example of aspects of a communications manager 1015, a communications manager 1115, or a communications manager 1310 described herein. The communications manager 1205 may include a DMRS configuration manager 1210, an interference layer categorization manager 1215, a data stream manager 1220, an encoder 1225, a CSI report manager 1230, a CSI-RS manager 1235, and an interference measurement manager 1240. Each of these modules may communicate, directly or indirectly, with one another (e.g., via one or more buses).

The DMRS configuration manager 1210 may transmit a configuration of a first one or more reference signal ports associated with at least one data stream for a UE, the first one or more reference signal ports being different from a second one or more reference signal ports unassociated with the at least one data stream for the UE. The interference layer categorization manager 1215 may transmit an indicator indicating a categorization of each of the second one or more reference signal ports as corresponding to one of a first type of layer or a second type of layer. For instance, the interference layer categorization manager 1215 may transmit the indicator in an RRC message, a MAC-CE, or a DCI message (e.g., the bitmap, row index, etc. may be configured via the RRC message, MAC-CE, or DCI message). In some examples, the interference layer categorization manager 1215 may transmit an indicator indicating a categorization of each port used to transmit on the second one or more CSI-RS resources for interference measurement as corresponding to one of a first type of interference layer or a second type of interference layer.

In some examples, the interference layer categorization manager 1215 may transmit an indication of a configuration table to be referenced by the UE using the one or more row indexes. In some examples, the interference layer categorization manager 1215 may transmit the indication of the configuration table in a RRC message, a MAC-CE, or a DCI message. In some cases, the indicator includes one or more reference signal indexes, one or more group indexes, one or more row indexes, one or more group table indexes, one or more port indexes, or any combination thereof. In some cases, the indicator includes a bitmap. In some cases, a number of bits in the bitmap corresponds to a number of the second one or more reference signal ports.

In some cases, the indicator indicates a first configuration table of a set of configuration tables based on a defined number of the first one or more reference signal ports, a defined number of layers associated with the first one or more reference signal ports, a defined number of layers associated with the second one or more reference signal ports, a defined number of the second one or more reference signal ports, or any combination thereof. In some cases, the first type of layer or the second type of layer is a non-linear precoding layer. In some cases, the first type of layer or the second type of layer is a linear precoding layer.

In some cases, the first type of layer or the second type of layer is a non-linear precoding layer. In some cases, the first type of layer or the second type of layer is a linear precoding layer. In some cases, the indicator includes one or more CSI-RS resource indexes, one or more group indexes, one or more row indexes, one or more group table indexes, or any combination thereof. In some cases, the indicator includes a bitmap. In some cases, a number of bits in the bitmap corresponds to a number of interference layers. In some cases, the indicator indicates a first configuration table of a set of configuration tables based on a number of the second one or more CSI-RS resources. The data stream manager 1220 may transmit the at least one data stream using the first one or more reference signal ports.

The CSI report manager 1230 may transmit a configuration of a first one or more CSI-RS resources for channel measurement and a configuration of a second one or more CSI-RS resources for interference measurement. In some examples, the CSI report manager 1230 may receive a report based on the categorization. The CSI-RS manager 1235 may transmit CSI-RSs in each of the first one or more CSI-RS resources and the second one or more CSI-RS resources in accordance with the indicator.

The encoder 1225 may receive a support indicator that indicates a defined number of the second one or more ports associated with the first type of layer, the second type of layer, or both, capable of being supported by the UE or a defined number of a second one or more layers of the first type, the second type, or both, capable of being supported by the UE. In some examples, the encoder 1225 may receive a support indicator that indicates a defined number of the first one or more ports associated with the first type of layer, the second type of layer, or both, capable of being supported by the UE or a defined number of a first one or more layers of the first type, the second type, or both, capable of being supported by the UE.

In some examples, the encoder 1225 may determine a parameter corresponding to one or more reference signal ports categorized as corresponding to the first type of layer. In some examples, the encoder 1225 may receive a support indicator that indicates a defined number of ports associated with the first type of layer in the second one or more CSI-RS resources, the second type of layer in the second one or more CSI-RS resources, or both, capable of being supported by a UE.

The interference measurement manager 1240 may identify a parameter in the report that indicates a measurement of the interference from the second one or more CSI-RS resources on the first one or more CSI-RS resources. In some cases, the report indicates a parameter determined based on the CSI-RSs and the categorization. In some cases, the report includes at least a CQI and the CQI is computed based on the parameter. In some cases, the report indicates an amplitude and phase of the parameter. In some cases, the report indicates an amplitude and phase of the parameter corresponding to a defined bandwidth. In some cases, the report indicates a first value corresponding to a defined bandwidth and a second value corresponding to a portion of the defined bandwidth. In some cases, the second value includes an offset relative to the first value.

Figure 13:
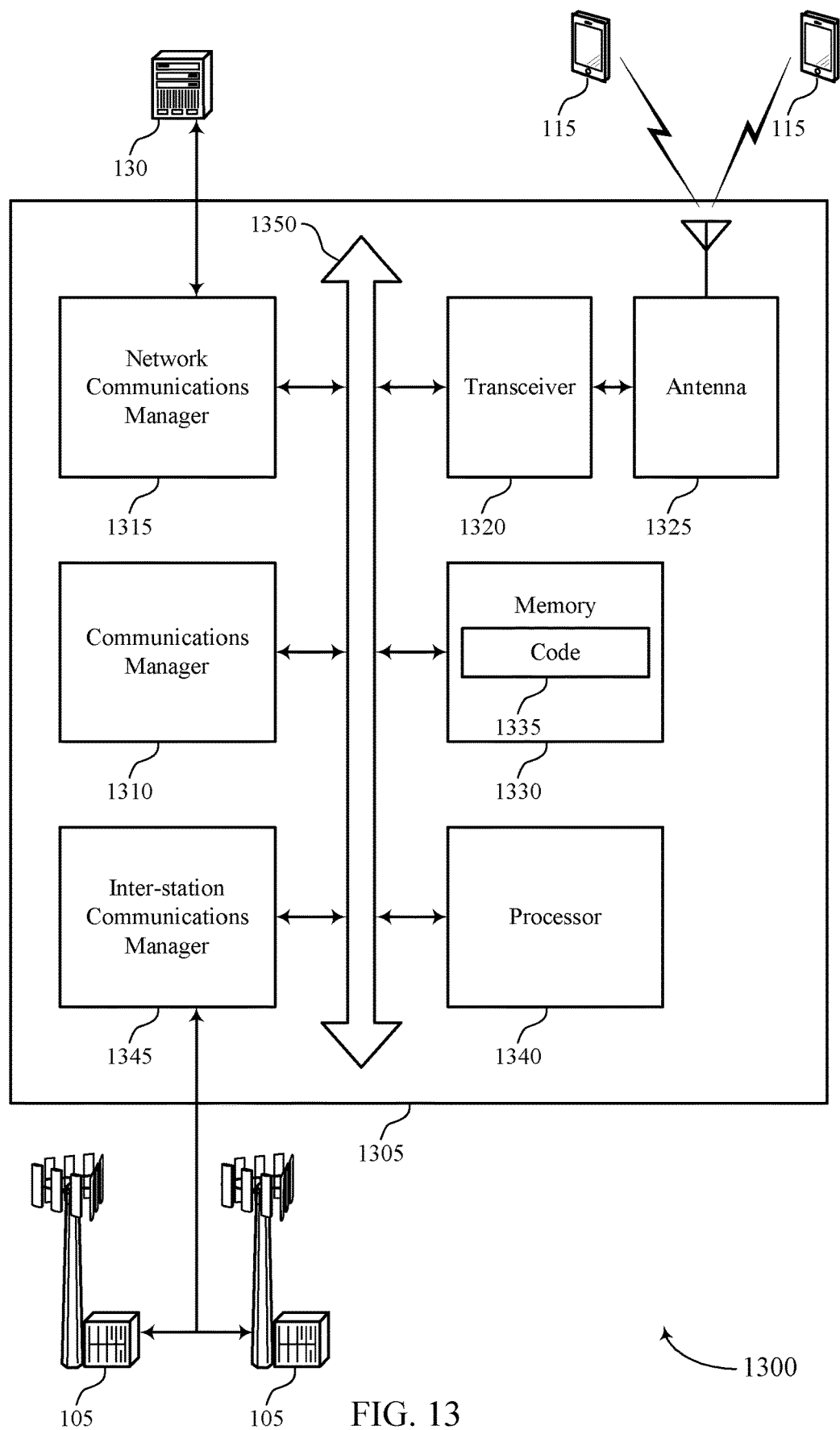
FIG. 13 shows a diagram of a system including a device that supports interference layer categorization and NZP IMR for NLP in accordance with aspects of the present disclosure.

FIG. 13 shows a diagram of a system 1300 including a device 1305 that supports interference layer categorization and NZP IMR for NLP in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a configuration of a first one or more reference signal ports associated with at least one data stream for a UE, the first one or more reference signal ports being different from a second one or more reference signal ports unassociated with the at least one data stream for the UE, transmit an indicator indicating a categorization of each of the second one or more reference signal ports as corresponding to one of a first type of layer or a second type of layer, and transmit the at least one data stream using the first one or more reference signal ports.

The communications manager 1310 may also transmit a configuration of a first one or more CSI-RS resources for channel measurement and a configuration of a second one or more CSI-RS resources for interference measurement, receive a report based on the categorization, transmit an indicator indicating a categorization of each port used to transmit on the second one or more CSI-RS resources for interference measurement as corresponding to one of a first type of interference layer or a second type of interference layer, and transmit CSI-RSs in each of the first one or more CSI-RS resources and the second one or more CSI-RS resources in accordance with the indicator.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting interference layer categorization and NZP IMR for NLP).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
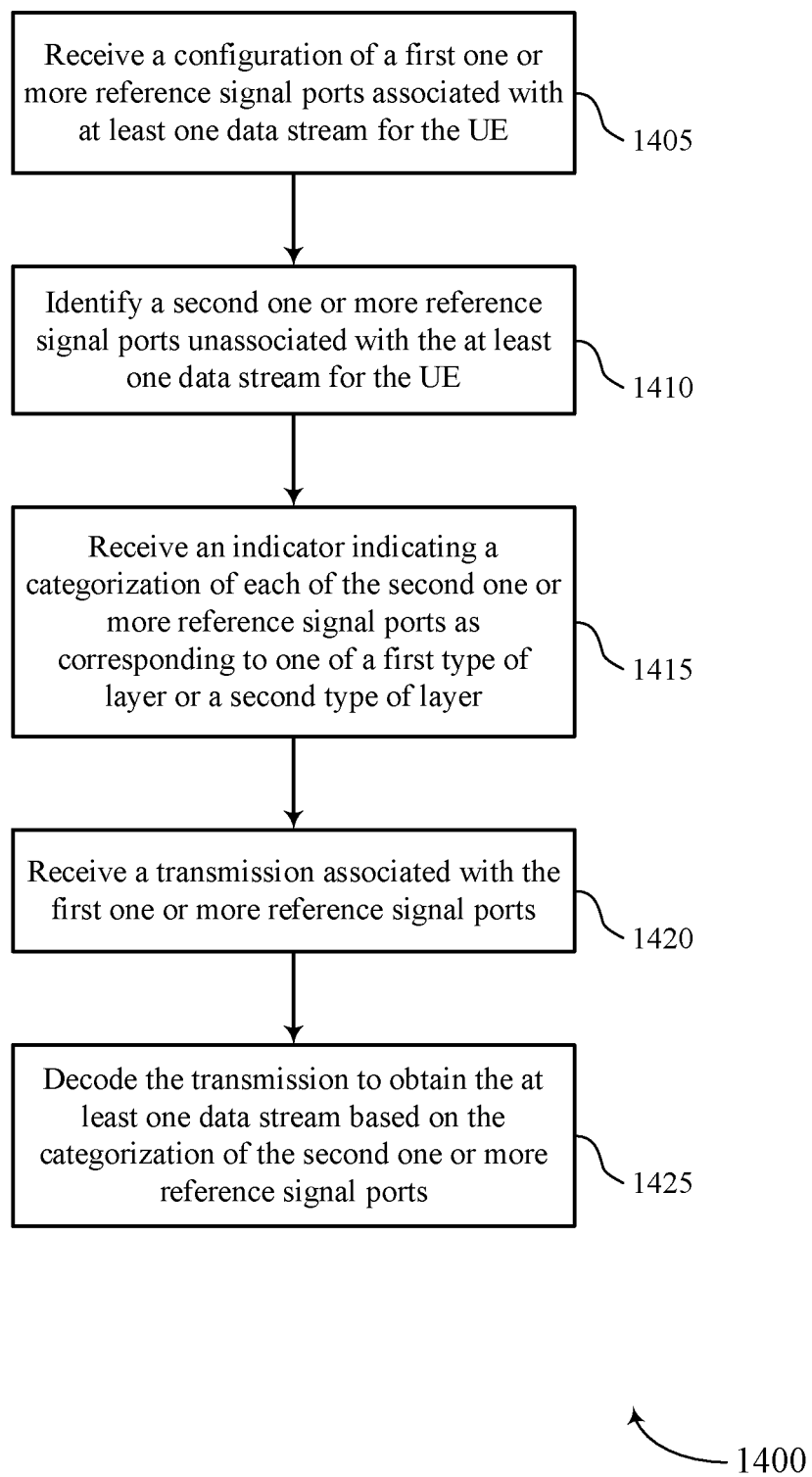
FIGS. 14 through 17 show flowcharts illustrating methods that support interference layer categorization and NZP IMR for NLP in accordance with aspects of the present disclosure.

FIG. 14 shows a flowchart illustrating a method 1400 that supports interference layer categorization and NZP IMR for NLP in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a configuration of a first one or more reference signal ports associated with at least one data stream for the UE. The operations of 1405 may be performed according to the methods described herein. In some examples, aspects of the operations of 1405 may be performed by a DMRS configuration manager as described with reference to FIGS. 6 through 9.

At 1410, the UE may identify a second one or more reference signal ports unassociated with the at least one data stream for the UE. The operations of 1410 may be performed according to the methods described herein. In some examples, aspects of the operations of 1410 may be performed by a DMRS configuration manager as described with reference to FIGS. 6 through 9.

At 1415, the UE may receive an indicator indicating a categorization of each of the second one or more reference signal ports as corresponding to one of a first type of layer or a second type of layer. The operations of 1415 may be performed according to the methods described herein. In some examples, aspects of the operations of 1415 may be performed by an interference layer categorization manager as described with reference to FIGS. 6 through 9.

At 1420, the UE may receive a transmission associated with the first one or more reference signal ports. The operations of 1420 may be performed according to the methods described herein. In some examples, aspects of the operations of 1420 may be performed by a decoder as described with reference to FIGS. 6 through 9.

At 1425, the UE may decode the transmission to obtain the at least one data stream based on the categorization of the second one or more reference signal ports. The operations of 1425 may be performed according to the methods described herein. In some examples, aspects of the operations of 1425 may be performed by a decoder as described with reference to FIGS. 6 through 9.

Figure 15:
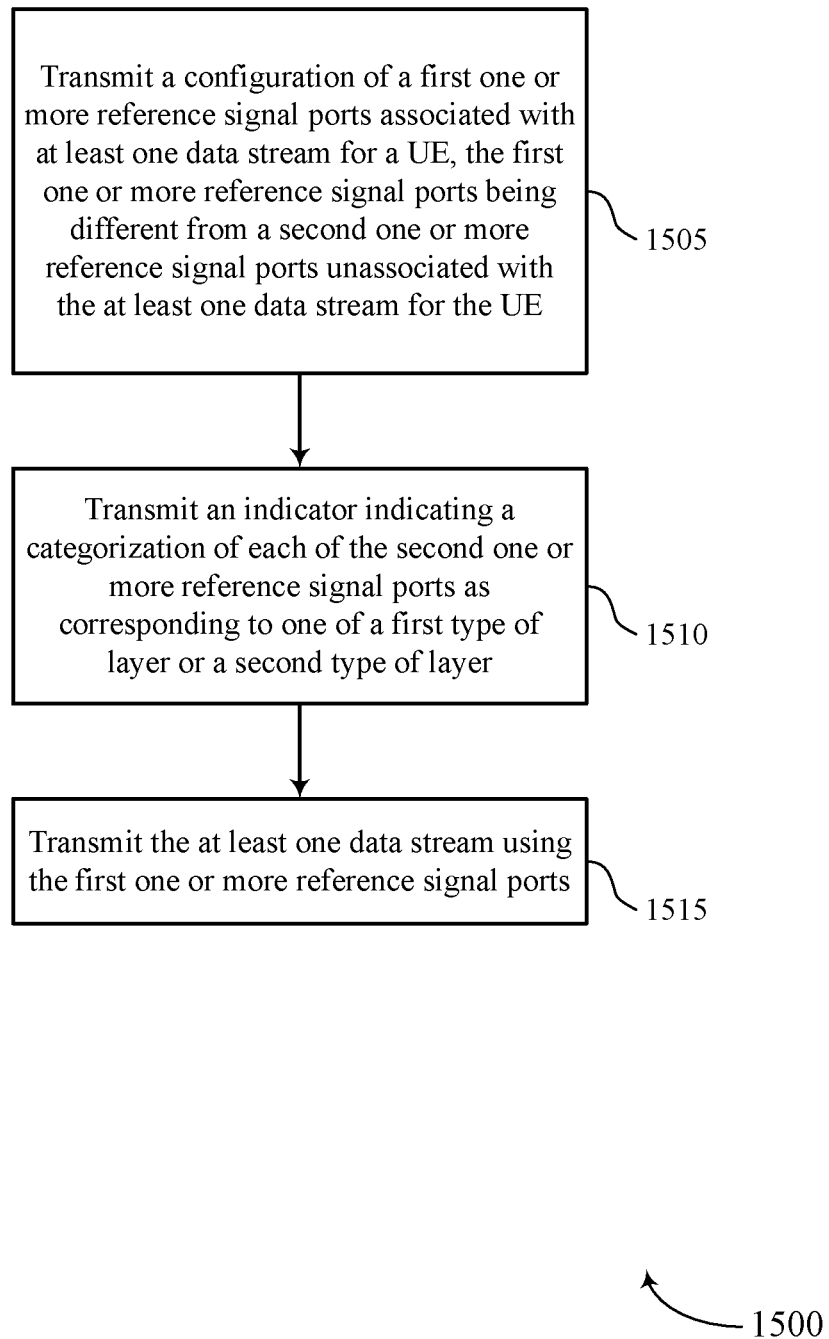

FIG. 15 shows a flowchart illustrating a method 1500 that supports interference layer categorization and NZP IMR for NLP in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1505, the base station may transmit a configuration of a first one or more reference signal ports associated with at least one data stream for a UE, the first one or more reference signal ports being different from a second one or more reference signal ports unassociated with the at least one data stream for the UE. The operations of 1505 may be performed according to the methods described herein. In some examples, aspects of the operations of 1505 may be performed by a DMRS configuration manager as described with reference to FIGS. 10 through 13.

At 1510, the base station may transmit an indicator indicating a categorization of each of the second one or more reference signal ports as corresponding to one of a first type of layer or a second type of layer. The operations of 1510 may be performed according to the methods described herein. In some examples, aspects of the operations of 1510 may be performed by an interference layer categorization manager as described with reference to FIGS. 10 through 13.

At 1515, the base station may transmit the at least one data stream using the first one or more reference signal ports. The operations of 1515 may be performed according to the methods described herein. In some examples, aspects of the operations of 1515 may be performed by a data stream manager as described with reference to FIGS. 10 through 13.

Figure 16:
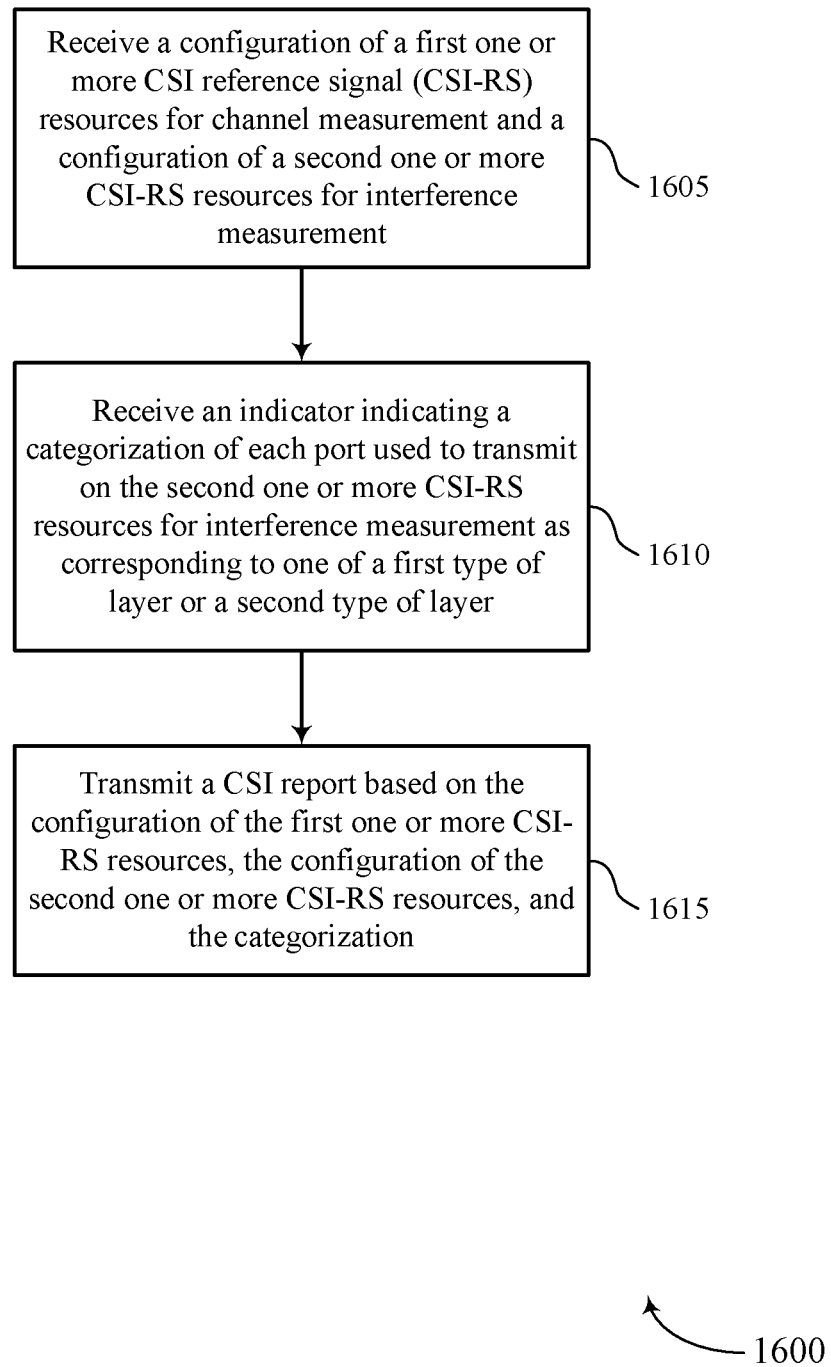

FIG. 16 shows a flowchart illustrating a method 1600 that supports interference layer categorization and NZP IMR for NLP in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive a configuration of a first one or more CSI reference signal (CSI-RS) resources for channel measurement and a configuration of a second one or more CSI-RS resources for interference measurement. The operations of 1605 may be performed according to the methods described herein. In some examples, aspects of the operations of 1605 may be performed by a CSI report manager as described with reference to FIGS. 6 through 9.

At 1610, the UE may receive an indicator indicating a categorization of each port used to transmit on the second one or more CSI-RS resources for interference measurement as corresponding to one of a first type of layer or a second type of layer. The operations of 1610 may be performed according to the methods described herein. In some examples, aspects of the operations of 1610 may be performed by an interference layer categorization manager as described with reference to FIGS. 6 through 9.

At 1615, the UE may transmit a CSI report based on the configuration of the first one or more CSI-RS resources, the configuration of the second one or more CSI-RS resources, and the categorization. The operations of 1615 may be performed according to the methods described herein. In some examples, aspects of the operations of 1615 may be performed by a CSI report manager as described with reference to FIGS. 6 through 9.

Figure 17:
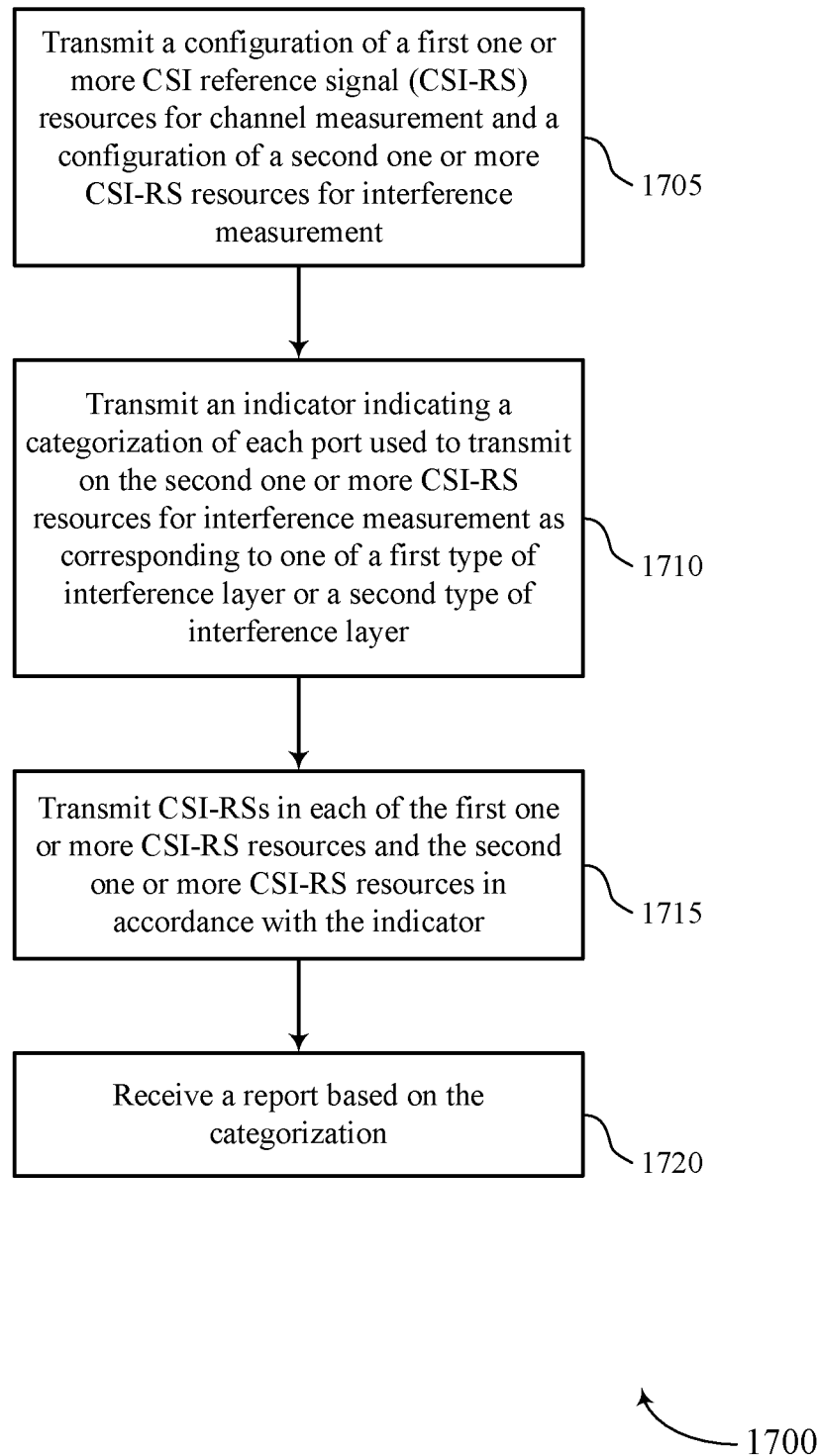

FIG. 17 shows a flowchart illustrating a method 1700 that supports interference layer categorization and NZP IMR for NLP in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit a configuration of a first one or more CSI reference signal (CSI-RS) resources for channel measurement and a configuration of a second one or more CSI-RS resources for interference measurement. The operations of 1705 may be performed according to the methods described herein. In some examples, aspects of the operations of 1705 may be performed by a CSI report manager as described with reference to FIGS. 10 through 13.

At 1710, the base station may transmit an indicator indicating a categorization of each port used to transmit on the second one or more CSI-RS resources for interference measurement as corresponding to one of a first type of interference layer or a second type of interference layer. The operations of 1710 may be performed according to the methods described herein. In some examples, aspects of the operations of 1710 may be performed by an interference layer categorization manager as described with reference to FIGS. 10 through 13.

At 1715, the base station may transmit CSI-RSs in each of the first one or more CSI-RS resources and the second one or more CSI-RS resources in accordance with the indicator. The operations of 1715 may be performed according to the methods described herein. In some examples, aspects of the operations of 1715 may be performed by a CSI-RS manager as described with reference to FIGS. 10 through 13.

At 1720, the base station may receive a report based on the categorization. The operations of 1720 may be performed according to the methods described herein. In some examples, aspects of the operations of 1720 may be performed by a CSI report manager as described with reference to FIGS. 10 through 13.

Embodiment 1

A method for wireless communication at a user equipment (UE), comprising: receiving a configuration of a first one or more reference signal ports associated with at least one data stream for the UE; identifying a second one or more reference signal ports unassociated with the at least one data stream for the UE; receiving an indicator indicating a categorization of each of the second one or more reference signal ports as corresponding to one of a first type of layer or a second type of layer; receiving a transmission associated with the first one or more reference signal ports; and decoding the transmission to obtain the at least one data stream based at least in part on the categorization of the second one or more reference signal ports.

Embodiment 2

The method of embodiment 1, wherein the indicator comprises one or more reference signal indexes of the first one or more reference signal ports, the method further comprising: identifying the categorization of each of the second one or more reference signal ports based at least in part on the one or more reference signal indexes of the first one or more reference signal ports.

Embodiment 3

The method of embodiment 2, wherein identifying the categorization of each of the second one or more reference signal ports further comprises: determining the categorization of each port of the second one or more reference signal ports based at least in part on a comparison of an index of a respective port of the second one or more reference signal ports with the one or more reference signal indexes.

Embodiment 4

The method of any embodiments 1 to 3, wherein the indicator comprises one or more reference signal indexes and one or more group indexes of the first one or more reference signal ports, the method further comprising: identifying the categorization of each of the second one or more reference signal ports based at least in part on the one or more reference signal indexes and the one or more group indexes.

Embodiment 5

The method of embodiment 4, wherein identifying the categorization of each of the second one or more reference signal ports further comprises: identifying the first one or more reference signal ports based at least in part on the one or more reference signal indexes and one or more configured groups of a plurality of groups based at least in part on the one or more group indexes; categorizing, within the one or more configured groups, each port of the second one or more reference signal ports as corresponding to the first type of layer; and categorizing, within each unconfigured group of the plurality of groups, each port of the second one or more reference signal ports as corresponding to the second type of layer.

Embodiment 6

The method of any embodiments 1 to 5, wherein the indicator comprises a bitmap, the method further comprising: identifying the categorization of each of the second one or more reference signal ports based at least in part on a respective bit within the bitmap.

Embodiment 7

The method of embodiment 6, wherein a number of bits in the bitmap corresponds to a number of the second one or more reference signal ports.

Embodiment 8

The method any embodiments 1 to 7, wherein the indicator comprises a row index, the method further comprising: identifying a first configuration table; and categorizing each of the second one or more reference signal ports as corresponding to one of the first type of layer or the second type of layer by indexing the first configuration table based at least in part on the row index.

Embodiment 9

The method of embodiment 8, wherein identifying the first configuration table comprises: receiving an indication of the first configuration table.

Embodiment 10

The method of embodiment 9, wherein receiving the indication of the first configuration table comprises: receiving the indication of the first configuration table in a radio resource control (RRC) message, a medium access control (MAC) control element (MAC-CE), or a downlink control information (DCI) message.

Embodiment 11

The method of embodiment 8, wherein the first configuration table comprises a single configuration table accessible by the UE.

Embodiment 12

The method of embodiment 8, wherein identifying the first configuration table comprises: identifying the first configuration table from a plurality of configuration tables based at least in part on a defined number of the first one or more reference signal ports, a defined number of layers associated with the first one or more reference signal ports, a defined number of layers associated with the second one or more reference signal ports, a defined number of the second one or more reference signal ports, or any combination thereof.

Embodiment 13

The method of any of embodiments 1 to 12, wherein the indicator comprises one or more reference signal indexes of the first one or more reference signal ports, the method further comprising: identifying indexes of the first one or more reference signal ports based at least in part on the indicator; identifying a first configuration table of a plurality of configuration tables; and categorizing each of the second one or more reference signal ports as corresponding to one of the first type of layer or the second type of layer by indexing the first configuration table based at least in part on the identified indexes of the first one or more reference signal ports.

Embodiment 14

The method of embodiment 13, wherein identifying the first configuration table comprises: receiving an indication of the first configuration table.

Embodiment 15

The method of embodiment 14, receiving the indication of the first configuration table comprises: receiving the indication of the first configuration table in a radio resource control (RRC) message, a medium access control (MAC) control element (MAC-CE), or a downlink control information (DCI) message.

Embodiment 16

The method of any of embodiments 1 to 15, wherein receiving the indicator comprises: receiving the indicator in a radio resource control (RRC) message, a medium access control (MAC) control element (MAC-CE), or a downlink control information (DCI) message.

Embodiment 17

The method of any of embodiments 1 to 16, further comprising: transmitting a support indicator that indicates a defined number of the second one or more ports associated with the first type of layer, the second type of layer, or both, capable of being supported by the UE or a defined number of a second one or more layers of the first type, the second type, or both, capable of being supported by the UE.

Embodiment 18

The method of any of embodiments 1 to 17, further comprising: transmitting a support indicator that indicates a defined number of the first one or more ports associated with the first type of layer, the second type of layer, or both, capable of being supported by the UE or a defined number of a first one or more layers of the first type, the second type, or both, capable of being supported by the UE.

Embodiment 19

The method of any of embodiments 1 to 18, wherein decoding the transmission further comprises: determining a parameter corresponding to a first port of the second one or more reference signal ports corresponding to the first type of layer; and decoding the at least one data stream based at least in part on the parameter.

Embodiment 20

The method of any of embodiments 1 to 19, wherein the first type of layer or the second type of layer is a non-linear precoding layer.

Embodiment 21

The method of any of embodiments 1 to 20, wherein the first type of layer or the second type of layer is a linear precoding layer.

Embodiment 22

A method for wireless communication at a base station, comprising: transmitting a configuration of a first one or more reference signal ports associated with at least one data stream for a user equipment (UE), the first one or more reference signal ports being different from a second one or more reference signal ports unassociated with the at least one data stream for the UE; transmitting an indicator indicating a categorization of each of the second one or more reference signal ports as corresponding to one of a first type of layer or a second type of layer; and transmitting the at least one data stream using the first one or more reference signal ports.

Embodiment 23

The method of embodiment 22, wherein the indicator comprises one or more reference signal indexes, one or more group indexes, one or more row indexes, one or more group table indexes, one or more port indexes, or any combination thereof.

Embodiment 24

The method of embodiment 23, wherein the indicator comprises the one or more row indexes, the method further comprising: transmitting an indication of a configuration table to be referenced by the UE using the one or more row indexes.

Embodiment 25

The method of embodiment 24, wherein transmitting the indication of the configuration table comprises: transmitting the indication of the configuration table in a radio resource control (RRC) message, a medium access control (MAC) control element (MAC-CE), or a downlink control information (DCI) message.

Embodiment 26

The method of any of embodiments 22 to 25, wherein the indicator comprises a bitmap.

Embodiment 27

The method of embodiment 26, wherein a number of bits in the bitmap corresponds to a number of the second one or more reference signal ports.

Embodiment 28

The method of any of embodiments 22 to 27, wherein the indicator indicates a first configuration table of a plurality of configuration tables based at least in part on a defined number of the first one or more reference signal ports, a defined number of layers associated with the first one or more reference signal ports, a defined number of layers associated with the second one or more reference signal ports, a defined number of the second one or more reference signal ports, or any combination thereof.

Embodiment 29

The method of any of embodiments 22 to 28, wherein transmitting the indicator comprises: transmitting the indicator in a radio resource control (RRC) message, a medium access control (MAC) control element (MAC-CE), or a downlink control information (DCI) message.

Embodiment 30

The method of any of embodiments 22 to 29, further comprising: receiving a support indicator that indicates a defined number of the second one or more ports associated with the first type of layer, the second type of layer, or both, capable of being supported by the UE or a defined number of a second one or more layers of the first type, the second type, or both, capable of being supported by the UE.

Embodiment 31

The method of any of embodiments 22 to 30, further comprising: receiving a support indicator that indicates a defined number of the first one or more ports associated with the first type of layer, the second type of layer, or both, capable of being supported by the UE or a defined number of a first one or more layers of the first type, the second type, or both, capable of being supported by the UE.

Embodiment 32

The method of any of embodiments 22 to 31, wherein the first type of layer or the second type of layer is a non-linear precoding layer.

Embodiment 33

The method of any of embodiments 22 to 32, wherein the first type of layer or the second type of layer is a linear precoding layer.

Embodiment 34

A method for wireless communication at a user equipment (UE), comprising: receiving a configuration of a first one or more channel state information (CSI) reference signal (CSI-RS) resources for channel measurement and a configuration of a second one or more CSI-RS resources for interference measurement; receiving an indicator indicating a categorization of each port used to transmit on the second one or more CSI-RS resources for interference measurement as corresponding to one of a first type of layer or a second type of layer; and transmitting a CSI report based at least in part on the configuration of the first one or more CSI-RS resources, the configuration of the second one or more CSI-RS resources, and the categorization.

Embodiment 35

The method of embodiment 34, wherein each of the first one or more CSI-RS resources and the second one or more CSI-RS resources is a non-zero power reference signal resource.

Embodiment 36

The method of any of embodiments 34 to 35, further comprising: transmitting a support indicator that indicates a defined number of ports associated with the first type of layer in the second one or more CSI-RS resources, the second type of layer in the second one or more CSI-RS resources, or both, capable of being supported by the UE.

Embodiment 37

The method of any of embodiments 34 to 36, wherein the report indicates CSI determined based at least in part on the channel measurement, one or more of the interference measurements, or both.

Embodiment 38

The method of any of embodiments 34 to 37, wherein the indicator comprises one or more indexes of the first one or more CSI-RS resources, the method further comprising: identifying the categorization of each port used to transmit on the second one or more CSI-RS resources based at least in part on the one or more indexes of the first one or more CSI-RS resources.

Embodiment 39

The method of embodiment 38, further comprising: determining that all ports used to transmit on a same resource of the second one or more CSI-RS resources have a same categorization; and determining the categorization of each port used to transmit on each CSI-RS resource of the second one or more CSI-RS resources based at least in part on a comparison of an index of a respective CSI-RS resource with the one or more indexes of the first one or more CSI-RS resources.

Embodiment 40

The method of any of embodiments 34 to 39, wherein the indicator comprises a bitmap, the method further comprising: determining that all ports used to transmit on a same resource of the second one or more CSI-RS resources have a same categorization; and identifying the categorization of each port used to transmit on each CSI-RS resource of the second one or more CSI-RS resources based at least in part on the bitmap, wherein a number of bits in the bitmap is equal to a number of resources of the second one or more CSI-RS resources.

Embodiment 41

The method of any of embodiments 34 to 40, wherein the indicator comprises a bitmap, the method further comprising: identifying the categorization of each port used to transmit on each CSI-RS resource of the second one or more CSI-RS resources based at least in part on the bitmap, wherein the number of bits in the bitmap is equal to a number of ports used to transmit on all of the second one or more CSI-RS resources.

Embodiment 42

The method of any of embodiments 34 to 41, wherein the indicator comprises a bitmap, the method further comprising: identifying a code division multiplexing (CDM) type applied for transmission on each resource of the second one or more CSI-RS resources; determining that all ports used to transmit on a resource of the second one or more CSI-RS resources associated with a same CDM group have a same categorization; and determining the categorization based at least in part on a bitmap, wherein a number of bits in the bitmap is equal to a number of CDM groups applied for transmission on all of the second one or more CSI-RS resources.

Embodiment 43

The method of any of embodiments 34 to 42, wherein the indicator comprises a row index, the method further comprising: identifying a first configuration table of a plurality of configuration tables; and categorizing each port used to transmit on each of the second one or more CSI-RS resources as corresponding to one of the first type of layer or the second type of layer by indexing the first configuration table based at least in part on the row index.

Embodiment 44

The method of embodiment 43, wherein: identifying the first configuration table is based at least in part on a number of the second one or more CSI-RS resources.

Embodiment 45

The method of any of embodiments 34 to 44, wherein the indicator comprises one or more indexes of the first one or more CSI-RS resources, the method further comprising: identifying indexes of the first one or more CSI-RS resources based at least in part on the indicator; identifying a first configuration table of a plurality of configuration tables; and categorizing each port used to transmit on each of the second one or more CSI-RS resources as corresponding to one of the first type of layer or the second type of layer by indexing the first configuration table based at least in part on the identified indexes of the first one or more CSI-RS resources.

Embodiment 46

The method of any of embodiments 34 to 45, wherein receiving the indicator further comprises: receiving at least one of a radio resource control (RRC) message, a medium access control (MAC) control element (MAC-CE), or a downlink control information (DCI) message indicating that each port used to transmit each of the second one or more CSI-RS resources corresponds to the first type of layer or the second type of layer.

Embodiment 47

The method of any of embodiments 34 to 46, further comprising: determining one or more parameters based at least in part on the first one or more CSI-RS resources, the second one or more CSI-RS resources, and the categorization, wherein the CSI report comprises the one or more parameters.

Embodiment 48

The method of embodiment 47, wherein the CSI report comprises at least a channel quality indicator (CQI) and the CQI is computed based at least in part on the one or more parameters.

Embodiment 49

The method of any of embodiments 47 to 48, wherein determining the one or more parameters further comprises: generating the channel measurement based at least in part on measuring the first one or more CSI-RS resources; generating a first interference measurement based at least in part on measuring the second one or more CSI-RS resources categorized as corresponding to the first type of layer; generating a second interference measurement based at least in part on measuring the second one or more CSI-RS resources categorized as corresponding to the second type of layer; and determining the one or more parameters based at least in part on the channel measurement, the first interference measurement, and the second interference measurement.

Embodiment 50

The method of any of embodiments 47 to 49, wherein each of the one or more parameters indicates a measure of interference from an interference layer corresponding to a port of the second one or more CSI-RS resources on a port of the first one or more CSI-RS resources.

Embodiment 51

The method of any of embodiments 47 to 50, wherein: reporting a parameter of the one or more parameters comprises reporting an amplitude and phase of the parameter.

Embodiment 52

The method of any of embodiments 47 to 51, wherein: reporting the amplitude and phase of a parameter of the one or more parameters comprises reporting the amplitude and phase of the parameter of the one or more parameters corresponding to a defined bandwidth.

Embodiment 53

The method of any of embodiments 47 to 52, wherein: reporting the amplitude and phase of a parameter of the one or more parameters comprises reporting a first value corresponding to a defined bandwidth and a second value corresponding to a portion of the defined bandwidth, wherein the second value comprises an offset relative to the first value.

Embodiment 54

A method for wireless communication at a base station, comprising: transmitting a configuration of a first one or more channel state information (CSI) reference signal (CSI-RS) resources for channel measurement and a configuration of a second one or more CSI-RS resources for interference measurement; transmitting an indicator indicating a categorization of each port used to transmit on the second one or more CSI-RS resources for interference measurement as corresponding to one of a first type of interference layer or a second type of interference layer; transmitting CSI-RSs in each of the first one or more CSI-RS resources and the second one or more CSI-RS resources in accordance with the indicator; and receiving a report based at least in part on the categorization.

Embodiment 55

The method of embodiment 54, further comprising: receiving a support indicator that indicates a defined number of ports associated with the first type of layer in the second one or more CSI-RS resources, the second type of layer in the second one or more CSI-RS resources, or both, capable of being supported by a user equipment (UE).

Embodiment 56

The method of any of embodiments 54 to 55, wherein the first type of layer or the second type of layer is a non-linear precoding layer.

Embodiment 57

The method of any of embodiments 54 to 56, wherein the first type of layer or the second type of layer is a linear precoding layer.

Embodiment 58

The method of any of embodiments 54 to 57, wherein the report indicates a parameter determined based at least in part on the CSI-RSs and the categorization.

Embodiment 59

The method of embodiment 58, wherein the report comprises at least a channel quality indicator (CQI) and the CQI is computed based at least in part on the parameter.

Embodiment 60

The method of embodiment 58, wherein the report indicates an amplitude and phase of the parameter.

Embodiment 61

The method of embodiment 58, wherein the report indicates an amplitude and phase of the parameter corresponding to a defined bandwidth.

Embodiment 62

The method of any of embodiments 54 to 61, wherein the report indicates a first value corresponding to a defined bandwidth and a second value corresponding to a portion of the defined bandwidth, and wherein the second value comprises an offset relative to the first value.

Embodiment 63

The method of any of embodiments 54 to 62, wherein the indicator comprises one or more CSI-RS resource indexes, one or more group indexes, one or more row indexes, one or more group table indexes, or any combination thereof.

Embodiment 64

The method of any of embodiments 54 to 63, wherein the indicator comprises a bitmap.

Embodiment 65

The method of any of embodiments 64 to 64, wherein a number of bits in the bitmap corresponds to a number of interference layers.

Embodiment 66

The method of any of embodiments 54 to 65, wherein the indicator indicates a first configuration table of a plurality of configuration tables based at least in part on a number of the second one or more CSI-RS resources.

Embodiment 67

An apparatus for wireless communication at a user equipment (UE), comprising: a processor; memory in electronic communication with the processor; and instructions stored in the memory and executable by the processor to cause the apparatus to perform a method of any of embodiments 1 to 21.

Embodiment 68

An apparatus for wireless communication at a base station, comprising: a processor; memory in electronic communication with the processor; and instructions stored in the memory and executable by the processor to cause the apparatus to perform a method of any of embodiments 22 to 33.

Embodiment 69

An apparatus for wireless communication at a user equipment (UE), comprising: a processor; memory in electronic communication with the processor; and instructions stored in the memory and executable by the processor to cause the apparatus to perform a method of any of embodiments 34 to 53.

Embodiment 70

An apparatus for wireless communication at a base station, comprising: a processor; memory in electronic communication with the processor; and instructions stored in the memory and executable by the processor to cause the apparatus to perform a method of any of embodiments 54 to 66.

Embodiment 71

An apparatus comprising at least one means for performing a method of any of embodiments 1 to 21.

Embodiment 72

An apparatus comprising at least one means for performing a method of any of embodiments 22 to 33.

Embodiment 73

An apparatus comprising at least one means for performing a method of any of embodiments 34 to 53.

Embodiment 73

An apparatus comprising at least one means for performing a method of any of embodiments 54 to 66.

Embodiment 75

A non-transitory computer-readable medium storing code for wireless communications, the code comprising instructions executable by a processor to perform a method of any of embodiments 1 to 21.

Embodiment 76

A non-transitory computer-readable medium storing code for wireless communications, the code comprising instructions executable by a processor to perform a method of any of embodiments 22 to 33.

Embodiment 77

A non-transitory computer-readable medium storing code for wireless communications, the code comprising instructions executable by a processor to perform a method of any of embodiments 34 to 53.

Embodiment 78

A non-transitory computer-readable medium storing code for wireless communications, the code comprising instructions executable by a processor to perform a method of any of embodiments 54 to 66.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting, from the UE, a support indicator that indicates a threshold quantity of non-linear precoding layers supported by the UE;
    receiving a configuration of a first one or more reference signal ports associated with at least one data stream for the UE, the configuration being based at least in part on the support indicator;
    identifying a second one or more reference signal ports unassociated with the at least one data stream for the UE;
    receiving an indicator indicating a categorization of each of the second one or more reference signal ports as corresponding to one of a first type of precoding layer or a second type of precoding layer, wherein a first subset of the second one or more reference signal ports are categorized as a non-linear precoding layer and a second subset of the second one or more reference signal ports are categorized as a linear precoding layer, and wherein a quantity of the first subset of the second one or more reference signal ports is less than or equal to the threshold quantity of non-linear precoding layers supported by the UE;
    receiving a transmission associated with the first one or more reference signal ports; and
    decoding the transmission to obtain the at least one data stream based at least in part on the categorization of the second one or more reference signal ports.

2. The method of claim 1, wherein the indicator comprises one or more reference signal indexes of the first one or more reference signal ports, the method further comprising:
    identifying the categorization of each of the second one or more reference signal ports based at least in part on the one or more reference signal indexes of the first one or more reference signal ports.

3. The method of claim 2, wherein identifying the categorization of each of the second one or more reference signal ports further comprises:
    determining the categorization of each port of the second one or more reference signal ports based at least in part on a comparison of an index of a respective port of the second one or more reference signal ports with the one or more reference signal indexes.

4. The method of claim 1, wherein the indicator comprises one or more reference signal indexes and one or more group indexes of the first one or more reference signal ports, the method further comprising:
    identifying the categorization of each of the second one or more reference signal ports based at least in part on the one or more reference signal indexes and the one or more group indexes.

5. The method of claim 4, wherein identifying the categorization of each of the second one or more reference signal ports further comprises:
    identifying the first one or more reference signal ports based at least in part on the one or more reference signal indexes and one or more configured groups of a plurality of groups based at least in part on the one or more group indexes;
    categorizing, within the one or more configured groups, each port of the second one or more reference signal ports as corresponding to the first type of precoding layer; and
    categorizing, within each unconfigured group of the plurality of groups, each port of the second one or more reference signal ports as corresponding to the second type of precoding layer.

6. The method of claim 1, wherein the indicator comprises a bitmap, the method further comprising:
    identifying the categorization of each of the second one or more reference signal ports based at least in part on a respective bit within the bitmap.

7. The method of claim 1, wherein the indicator comprises a row index, the method further comprising:
    identifying a first configuration table; and
    categorizing each of the second one or more reference signal ports as corresponding to one of the first type of precoding layer or the second type of precoding layer by indexing the first configuration table based at least in part on the row index.

8. The method of claim 1, wherein the indicator comprises one or more reference signal indexes of the first one or more reference signal ports, the method further comprising:
    identifying indexes of the first one or more reference signal ports based at least in part on the indicator;
    identifying a first configuration table of a plurality of configuration tables; and
    categorizing each of the second one or more reference signal ports as corresponding to one of the first type of precoding layer or the second type of precoding layer by indexing the first configuration table based at least in part on the identified indexes of the first one or more reference signal ports.

9. The method of claim 1,
    wherein the support indicator further indicates a defined number of the second one or more reference signal ports associated with the linear precoding layer, capable of being supported by the UE or a defined number of a second one or more layers of the first type, the second type, or both, capable of being supported by the UE.

10. The method of claim 1, wherein decoding the transmission further comprises:
    determining a parameter corresponding to a first port of the second one or more reference signal ports corresponding to the first type of precoding layer; and
    decoding the at least one data stream based at least in part on the parameter.

11. The method of claim 1, wherein the first type of precoding layer or the second type of precoding layer is the non-linear precoding layer.

12. A method for wireless communication at a network device, comprising:
    receiving, from a user equipment (UE), a support indicator that indicates a threshold quantity of non-linear precoding layers supported by the UE;
    transmitting a configuration of a first one or more reference signal ports associated with at least one data stream for the UE, the first one or more reference signal ports being different from a second one or more reference signal ports unassociated with the at least one data stream for the UE, wherein the configuration is based at least in part on the support indicator;
    transmitting an indicator indicating a categorization of each of the second one or more reference signal ports as corresponding to one of a first type of precoding layer or a second type of precoding layer, wherein a first subset of the second one or more reference signal ports are categorized as a non-linear precoding layer and a second subset of the second one or more reference signal ports are categorized as a linear precoding layer and wherein a quantity of the first subset of the second one or more reference signal ports is less than or equal to the threshold quantity of non-linear precoding layers supported by the UE; and transmitting the at least one data stream using the first one or more reference signal ports.

13. The method of claim 12, wherein the indicator comprises one or more reference signal indexes, one or more group indexes, one or more row indexes, one or more group table indexes, one or more port indexes, or any combination thereof.

14. The method of claim 13, wherein the indicator comprises the one or more row indexes, the method further comprising:

transmitting an indication of a configuration table to be referenced by the UE using the one or more row indexes.

15. The method of claim 14, wherein transmitting the indication of the configuration table comprises:

transmitting the indication of the configuration table in a radio resource control (RRC) message, a medium access control (MAC) control element (MAC-CE), or a downlink control information (DCI) message.

16. The method of claim 12, wherein the indicator comprises a bitmap.

17. The method of claim 12, wherein the indicator indicates a first configuration table of a plurality of configuration tables based at least in part on a defined number of the first one or more reference signal ports, a defined number of layers associated with the first one or more reference signal ports, a defined number of layers associated with the second one or more reference signal ports, a defined number of the second one or more reference signal ports, or any combination thereof.

18. The method of claim 12, wherein transmitting the indicator comprises:

transmitting the indicator in a radio resource control (RRC) message, a medium access control (MAC) control element (MAC-CE), or a downlink control information (DCI) message.

19. The method of claim 12, wherein the support indicator further indicates a defined number of the second one or more reference signal ports associated with the linear precoding layer, capable of being supported by the UE or a defined number of a second one or more layers of the first type, the second type, or both, capable of being supported by the UE.

20. The method of claim 12, wherein the support indicator further indicates a defined number of the first one or more reference signal ports associated with the linear precoding layer, capable of being supported by the UE or a defined number of a first one or more layers of the first type, the second type, or both, capable of being supported by the UE.

21. The method of claim 12, wherein the first type of precoding layer or the second type of precoding layer is the non-linear precoding layer.

22. An apparatus for wireless communication at a user equipment (UE), comprising:

a processor,
memory in electronic communication with the processor; and
instructions stored in the memory and executable by the processor to cause the apparatus to:
transmit, from the UE, a support indicator that indicates a threshold quantity of non-linear precoding layers supported by the UE;
receive a configuration of a first one or more reference signal ports associated with at least one data stream for the UE, the configuration being based at least in part on the support indicator;
identify a second one or more reference signal ports unassociated with the at least one data stream for the UE;
receive an indicator indicating a categorization of each of the second one or more reference signal ports as corresponding to one of a first type of precoding layer or a second type of precoding layer, wherein a first subset of the second one or more reference signal ports are categorized as a non-linear precoding layer and a second subset of the second one or more reference signal ports are categorized as a linear precoding layer, and wherein a quantity of the first subset of the second one or more reference signal ports is less than or equal to the threshold quantity of non-linear precoding layers supported by the UE;
receive a transmission associated with the first one or more reference signal ports; and
decode the transmission to obtain the at least one data stream based at least in part on the categorization of the second one or more reference signal ports.

23. The apparatus of claim 22, wherein the indicator comprises one or more reference signal indexes of the first one or more reference signal ports, and the processor is further configured to cause the apparatus to:

identify the categorization of each of the second one or more reference signal ports based at least in part on the one or more reference signal indexes of the first one or more reference signal ports.

24. The apparatus of claim 23, wherein, to identify the categorization of each of the second one or more reference signal ports, the processor is further configured to cause the apparatus to:

determine the categorization of each port of the second one or more reference signal ports based at least in part on a comparison of an index of a respective port of the second one or more reference signal ports with the one or more reference signal indexes.

25. The apparatus of claim 22, wherein the indicator comprises one or more reference signal indexes and one or more group indexes of the first one or more reference signal ports, and the processor is further configured to cause the apparatus to:

identify the categorization of each of the second one or more reference signal ports based at least in part on the one or more reference signal indexes and the one or more group indexes.

26. The apparatus of claim 25, wherein, to identify the categorization of each of the second one or more reference signal ports, the processor is further configured to cause the apparatus to:

identify the first one or more reference signal ports based at least in part on the one or more reference signal indexes and one or more configured groups of a plurality of groups based at least in part on the one or more group indexes;

categorize, within the one or more configured groups, each port of the second one or more reference signal ports as corresponding to the first type of precoding layer; and categorize, within each unconfigured group of the plurality of groups, each port of the second one or more reference signal ports as corresponding to the second type of precoding layer.

27. The apparatus of claim 22, wherein the indicator comprises a bitmap, and the processor is further configured to cause the apparatus to:

identify the categorization of each of the second one or more reference signal ports based at least in part on a respective bit within the bitmap.

28. The apparatus of claim 22, wherein the indicator comprises a row index, and the processor is further configured to cause the apparatus to:

identify a first configuration table; and categorize each of the second one or more reference signal ports as corresponding to one of the first type of precoding layer or the second type of precoding layer by indexing the first configuration table based at least in part on the row index.

29. The apparatus of claim 22, wherein the indicator comprises one or more reference signal indexes of the first one or more reference signal ports, and the processor is further configured to cause the apparatus to:

identify indexes of the first one or more reference signal ports based at least in part on the indicator;

identify a first configuration table of a plurality of configuration tables; and categorize each of the second one or more reference signal ports as corresponding to one of the first type of precoding layer or the second type of precoding layer by indexing the first configuration table based at least in part on the identified indexes of the first one or more reference signal ports.

30. The apparatus of claim 22, wherein the support indicator further indicates a defined number of the second one or more reference signal ports associated with the linear precoding layer, capable of being supported by the UE or a defined number of a second one or more layers of the first type, the second type, or both, capable of being supported by the UE.

31. The apparatus of claim 22, wherein, to decode the transmission the processor is configured to cause the apparatus to:

determine a parameter corresponding to a first port of the second one or more reference signal ports corresponding to the first type of precoding layer; and decode the at least one data stream based at least in part on the parameter.

32. The apparatus of claim 22, wherein the first type of precoding layer or the second type of precoding layer is the non-linear precoding layer.

33. An apparatus for wireless communication at a network entity, comprising:

a processor, memory in electronic communication with the processor; and instructions stored in the memory and executable by the processor to cause the apparatus to:

receive, from a user equipment (UE), a support indicator that indicates a threshold quantity of non-linear precoding layers supported by the UE;

transmit a configuration of a first one or more reference signal ports associated with at least one data stream for a user equipment (UE), the first one or more reference signal ports being different from a second one or more reference signal ports unassociated with the at least one data stream for the UE, wherein the configuration is based at least in part on the support indicator;

transmit an indicator indicating a categorization of each of the second one or more reference signal ports as corresponding to one of a first type of precoding layer or a second type of precoding layer, wherein a first subset of the second one or more reference signal ports are categorized as a non-linear precoding layer and a second subset of the second one or more reference signal ports are categorized as a linear precoding layer, and wherein a quantity of the first subset of the second one or more reference signal ports is less than or equal to the threshold quantity of non-linear precoding layers supported by the UE; and transmit the at least one data stream using the first one or more reference signal ports.

34. The apparatus of claim 33, wherein the indicator comprises one or more reference signal indexes, one or more group indexes, one or more row indexes, one or more group table indexes, one or more port indexes, or any combination thereof.

35. The apparatus of claim 34, wherein the indicator comprises the one or more row indexes, and the processor is further configured to cause the apparatus to:

transmit an indication of a configuration table to be referenced by the UE using the one or more row indexes.

36. The apparatus of claim 35, wherein, to transmit the indication of the configuration table, the processor is further configured to cause the apparatus to:

transmit the indication of the configuration table in a radio resource control (RRC) message, a medium access control (MAC) control element (MAC-CE), or a downlink control information (DCI) message.

37. The apparatus of claim 33, wherein the indicator comprises a bitmap.

38. The apparatus of claim 33, wherein the indicator indicates a first configuration table of a plurality of configuration tables based at least in part on a defined number of the first one or more reference signal ports, a defined number of layers associated with the first one or more reference signal ports, a defined number of layers associated with the second one or more reference signal ports, a defined number of the second one or more reference signal ports, or any combination thereof.

39. The apparatus of claim 33, wherein, to transmit the indicator, the processor is configured to cause the apparatus to:

transmit the indicator in a radio resource control (RRC) message, a medium access control (MAC) control element (MAC-CE), or a downlink control information (DCI) message.

40. The apparatus of claim 33, wherein the support indicator further indicates a defined number of the second one or more reference signal ports associated with the linear precoding layer, capable of being supported by the UE or a defined number of a second one or more layers of the first type, the second type, or both, capable of being supported by the UE.

41. The apparatus of claim 33, wherein the support indicator further indicates a defined number of the first one or more reference signal ports associated with the linear precoding layer, capable of being supported by the UE or a defined number of a first one or more layers of the first type, the second type, or both, capable of being supported by the UE.

42. The apparatus of claim 33, wherein the first type of precoding layer or the second type of precoding layer is the non-linear precoding layer.

* * * * *